(12) United States Patent
Duby

(10) Patent No.: US 11,229,863 B2
(45) Date of Patent: Jan. 25, 2022

(54) DISCHARGE FILTER PLATE ASSEMBLY FOR FILTER PRESS

(71) Applicant: Sean R. Duby, Corona del Mar, CA (US)

(72) Inventor: Sean R. Duby, Corona del Mar, CA (US)

(*) Notice: Subject to any disclaimer, the term of this patent is extended or adjusted under 35 U.S.C. 154(b) by 0 days.

(21) Appl. No.: 16/381,435

(22) Filed: Apr. 11, 2019

(65) Prior Publication Data

US 2019/0314742 A1 Oct. 17, 2019

Related U.S. Application Data

(60) Provisional application No. 62/656,228, filed on Apr. 11, 2018.

(51) Int. Cl.
*B01D 25/164* (2006.01)

(52) U.S. Cl.
CPC .................... *B01D 25/164* (2013.01)

(58) Field of Classification Search
CPC ...... B01D 25/164; B01D 25/32; B01D 25/12; B01D 25/305; B01D 25/386; B01D 25/346; B01D 25/285; B01D 25/215; B01D 25/325; B01D 25/38; B01D 25/284; B01D 2201/4046; B01D 2201/34
USPC .......................... 210/224–232, 332, 346, 486
See application file for complete search history.

(56) References Cited

U.S. PATENT DOCUMENTS

| 3,620,233 A | 11/1971 | Busse et al. |
| 3,637,082 A | 1/1972 | Bentzien |
| 4,366,055 A * | 12/1982 | Gwilliam ............... B01D 29/15 210/350 |
| 4,584,100 A * | 4/1986 | Choquenet ........... B01D 25/322 100/198 |
| 2008/0264879 A1* | 10/2008 | Duby ..................... B01D 25/12 210/770 |
| 2015/0336032 A1* | 11/2015 | Duby ................... B01D 25/325 210/798 |

FOREIGN PATENT DOCUMENTS

| EP | 1 676 617 A1 | 7/2006 |
| ES | 2200925 T | 3/2004 |
| FR | 123466 | 10/1960 |
| FR | 1323483 | 4/1963 |
| JP | S5751617 | 4/1963 |

OTHER PUBLICATIONS

International Search Report and Written Opinion for PCT/US 19/26894 dated Jun. 28, 2019 in 13 pages.

* cited by examiner

*Primary Examiner* — Madeline Gonzalez
(74) *Attorney, Agent, or Firm* — Knobbe, Martens, Olson & Bear LLP

(57) ABSTRACT

A filter plate assembly for a filter press is provided. The filter plate assembly includes at least a first filter plate and a second filter plate, which cooperate to define a filter chamber when the first filter plate and the second filter plate are in a filtering position. At least one of the first filter plate and the second filter plate is movable from the filtering position to a discharge position in which a filter cake can be discharged. In other configurations, the filter plate assembly can include a first filter plate, a second filter plate and a center filter plate or frame, which cooperate to define a filter chamber. The center filter plate or frame is movable from a filtering position to a discharge position.

23 Claims, 25 Drawing Sheets

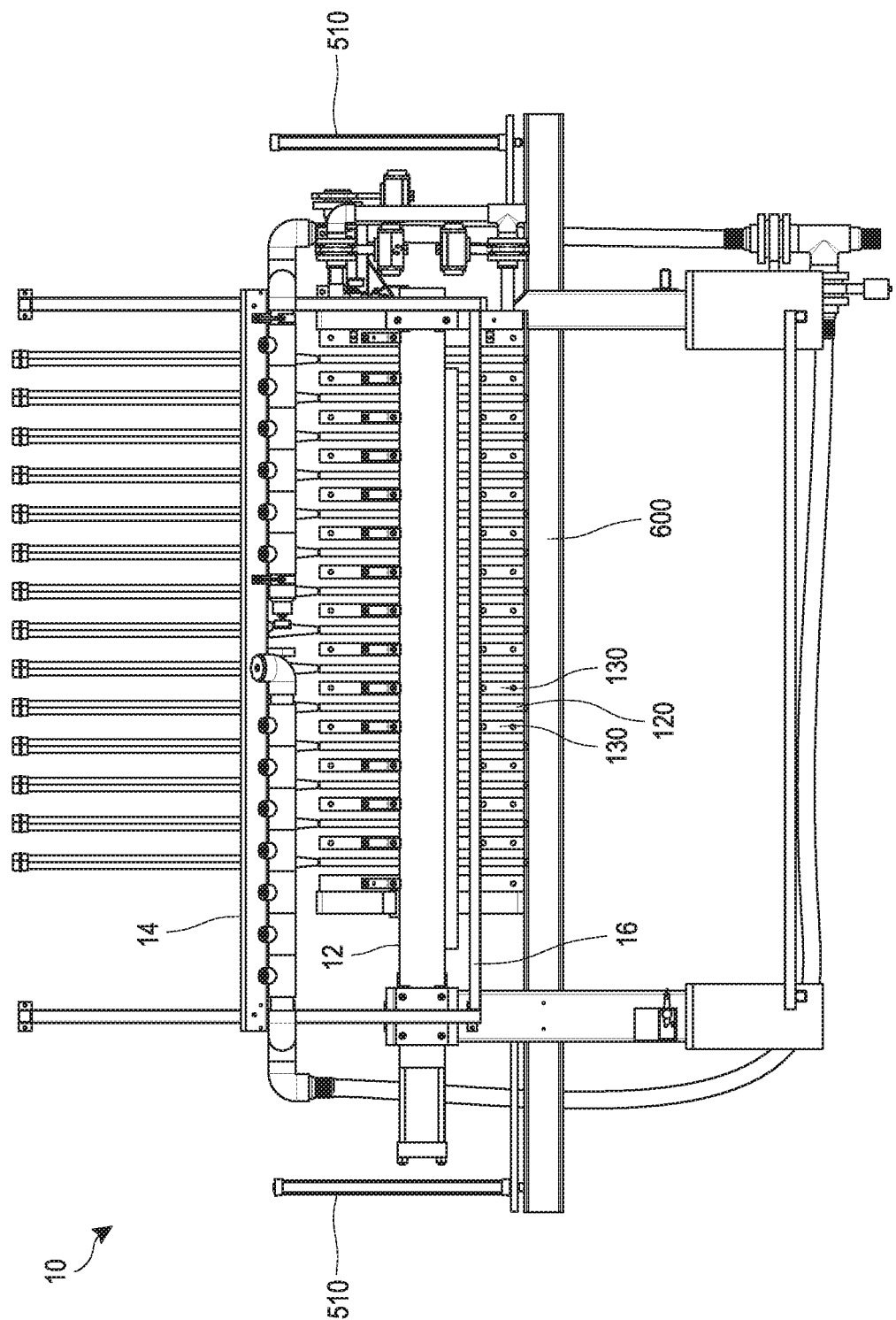

DISCHARGE FILTER PLATE ASSEMBLY FOR FILTER PRESS

INCORPORATION BY REFERENCE TO ANY PRIORITY APPLICATIONS

This application claims the benefit of U.S. Provisional Patent Application No. 62/656,228, entitled "DISCHARGE FILTER PLATE ASSEMBLY FOR FILTER PRESS," filed Apr. 11, 2018.

This application hereby incorporates by reference the above-identified provisional application in its entirety.

BACKGROUND

Field of the Invention

The present disclosure is related to an improved filter plate assembly, and related methods and devices, for separating solid and liquid components from a mixture.

Description of the Related Art

Separating the liquid and solid components of a liquid-solid mixture, or slurry, is a necessary or desirable process in many industries. One method of filtering slurries having relatively high concentrations of solid matter uses an apparatus known as a filter press. In existing filter presses, the solid particulate "cake" remaining in a filter cavity must be removed in preparation for a subsequent filter cycle. This cleaning process has one or more disadvantages. In many cases, the removal of the particulate cake requires that the filter plates be separated from one another, individually or all at one time, to permit the cake to be discharged from the filter cavity. Because as many as a hundred or more individual plates may be used, the cleaning process can be very time-consuming.

In other cases, it is possible for particulate cake to be discharged from the filter chambers of the filter press while the individual filter plates are maintained in a substantially compacted, or condensed, position. One way to accomplish this is to have a perimeter of each filter chamber configured to have an open section, as disclosed in Applicant's U.S. Pat. No. 7,396,472. A closure can be configured to close the open section, and the closure is removable from the open section to permit particulate cake to be removed from the filter chamber while the filter plates are in a condensed position. Although this approach allows for the individual filter plates to remain in a compacted, or condensed, position, methods and devices that currently exist for removing the cake under this approach may fail to completely dislodge or remove particulate matter remaining within the filter chamber after the particulate cake has been discharged. In addition, under this approach, the open section of the filter chamber can be difficult to fully seal when the filter press is in use. Furthermore, under this approach, the sprayer assembly or spray nozzle of the filter press wash apparatus is contained within the filter chamber. An interior, as opposed to exterior, wash mechanism such as this may result in clogging or blockage of wash fluid within the filter chamber.

SUMMARY

One or more embodiments involve a filter plate assembly and/or a filter press incorporating the filter plate assembly. The filter plate assembly comprises at least a first filter plate and a second filter plate, which cooperate to at least partially define a filter chamber when the first filter plate and the second filter plate are in a filtering position aligned with one another along an operational axis. At least one of the first filter plate and the second filter plate is movable out of alignment with the operational axis or in a direction normal to the operational axis to a discharge position in which a filter cake can be discharged from a portion of the filter chamber defined by the movable filter plate(s). In some configurations, the discharge process can be executed automatically without the need for an operator. In some configurations, at least one support structure movably supports the movable filter plate(s) for movement between the filtering position and the discharge position. In some configurations, the filter plate assembly comprises a first filter plate and a second filter plate, wherein one or both of the filter plates define a recessed cavity, which defines the filter chamber when the filter plates are in the filtering position. In other configurations, the filter plate assembly comprises a first filter plate, a second filter plate and a center filter plate or frame, as discussed further herein. One or both of the first filter plate and the second filter plate can also form a portion of another filter plate assembly. For example, the second filter plate can form an end of one filter cavity on a first side of the second filter plate and an end of another filter cavity on a second side of the second filter plate.

In one embodiment, a filter plate assembly comprises a first filter plate having a first side surface, a second filter plate having a second side surface, and a center plate or frame having an outer surface and an interior region. The center plate or frame is configured to be movable between a filtering or aligned position and a discharge or separated position relative to the first filter plate and the second filter plate. In the filtering position, the center plate or frame is held in place between the first side surface and the second side surface. In the discharge position, the first filter plate and the second filter plate separate from the center plate a distance, thereby permitting the center plate to drop or move toward or to the discharge position, whereupon particulate cake is discharged from the interior region of the center plate.

In another embodiment, a filter plate assembly comprises a first filter plate and a second filter plate. The first filter plate and the second filter plate have a filtering position in which the plates are aligned within one another along an operational axis and cooperate to at least partially define a filter chamber. The first filter plate is movable out of alignment with the second filter plate and away from the operational axis to a discharge position in which filter cake can be discharged from a portion of the filter chamber at least partially defined by at least one of the first filter plate and the second filter plate.

An embodiment involves a filter plate assembly and/or a filter press incorporating the filter plate assembly. The filter plate assembly comprises at least a first filter plate and a second filter plate, which cooperate to at least partially define a filter chamber. At least one sprayer assembly is movably supported relative to one or both of the first filter plate and the second filter plate. The at least one sprayer assembly is movable out of alignment with the operational axis or in a direction normal to the operational axis to direct a sprayed media toward one or both of the first filter plate and the second filter plate.

BRIEF DESCRIPTION OF THE DRAWINGS

These and other features, aspects, and advantages of the present filter plate assembly are described with reference to the drawings of the preferred embodiments. These embodiments are intended to illustrate, but not to limit, the present invention.

FIG. 25 is a side view of the filter press of FIG. 23 with the fluid hoses removed and the filter plate assemblies shown in an aligned (or up) position.

DETAILED DESCRIPTION

Figure 1:
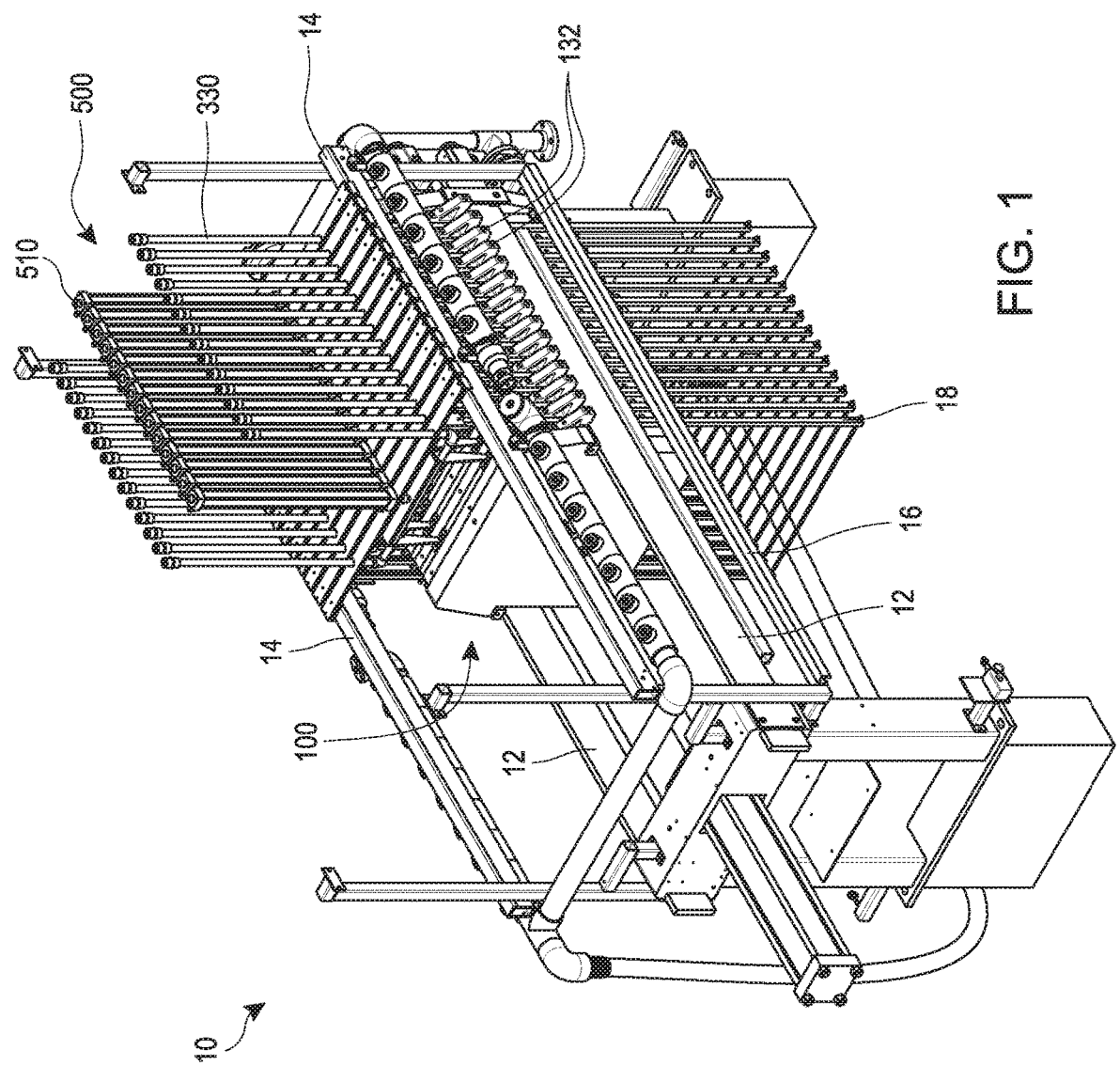
FIG. 1 is a perspective view of a filter press incorporating a filter plate assembly having certain features, aspects, and advantages of the present invention. The filter plate assembly is shown in a retracted position. The fluid hoses connecting the wash fluid source to the sprayer assemblies are removed.
Figure 2:
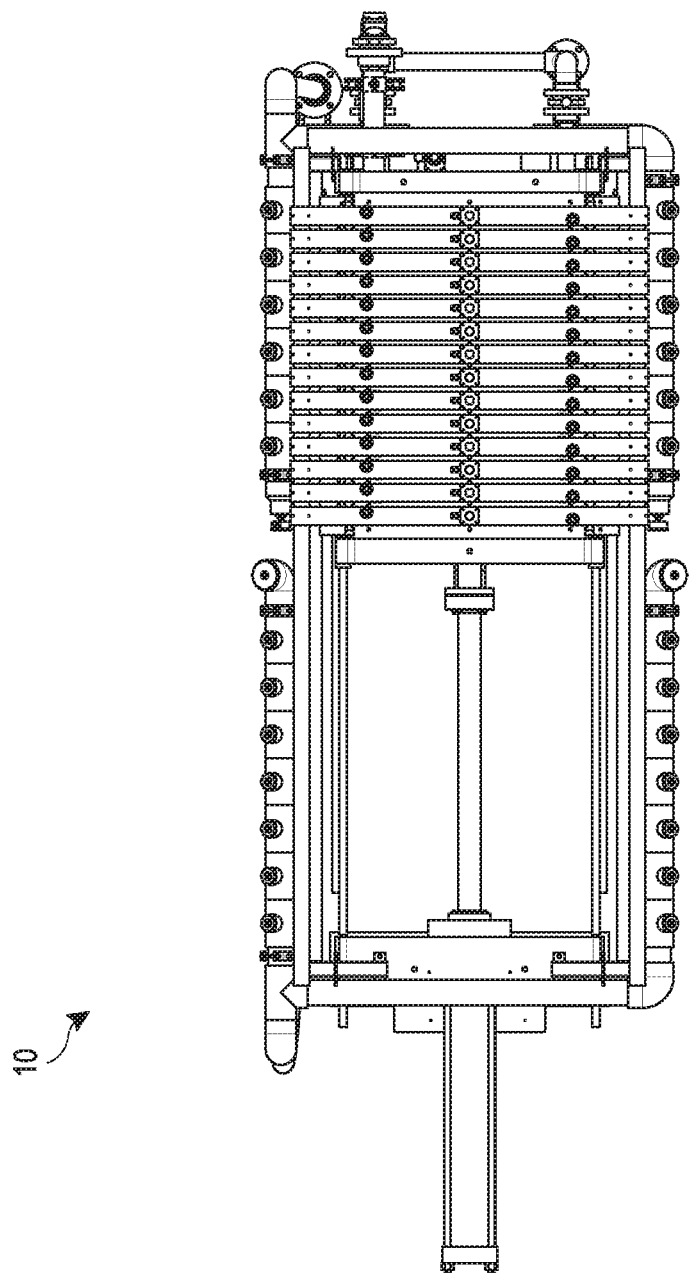
FIG. 2 is a top view of the filter press of FIG. 1.
Figure 3:
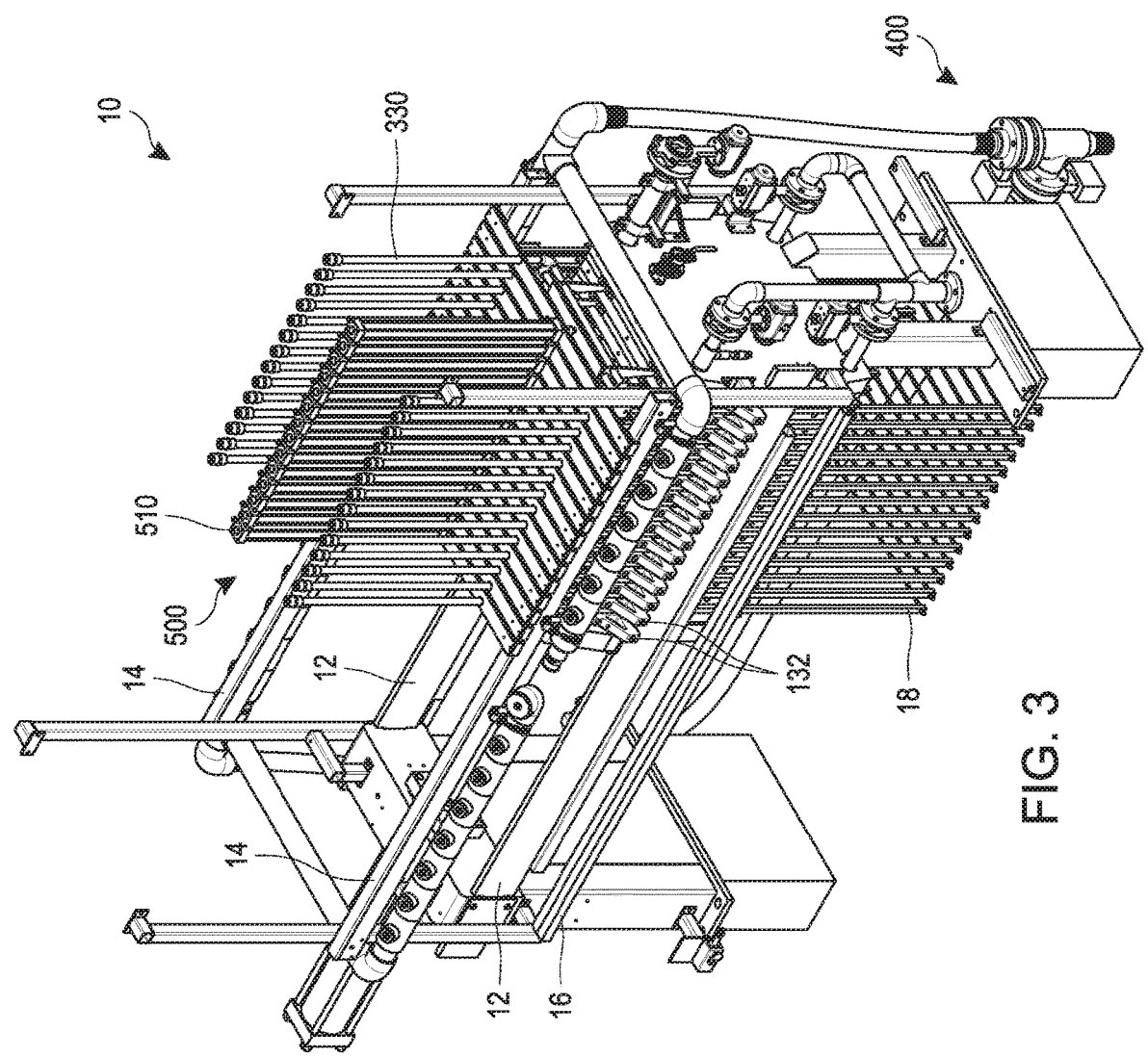
FIG. 3 is another perspective view of the filter press of FIG. 1.
Figure 4:
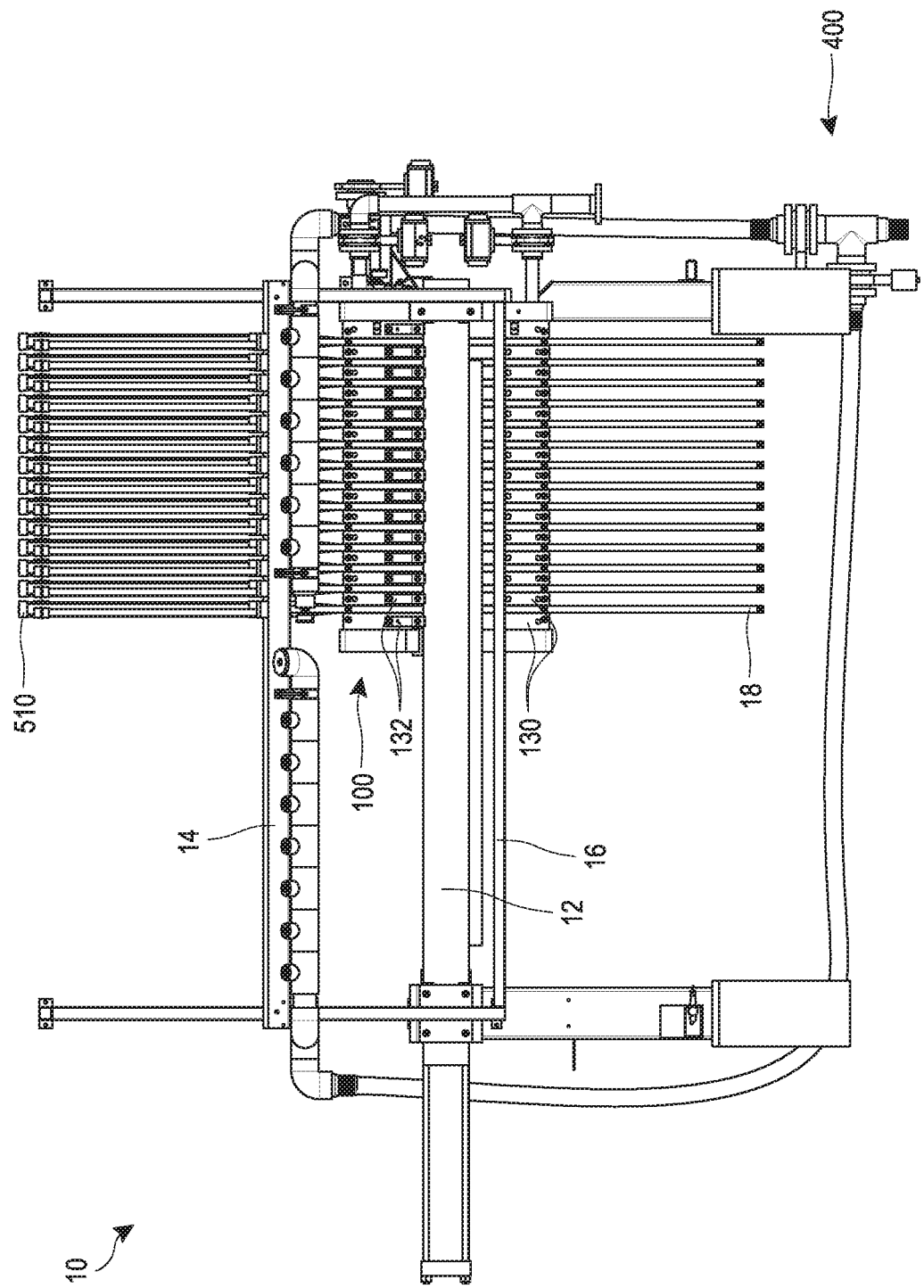
FIG. 4 is a side view of the filter press of FIG. 1.
Figure 5:
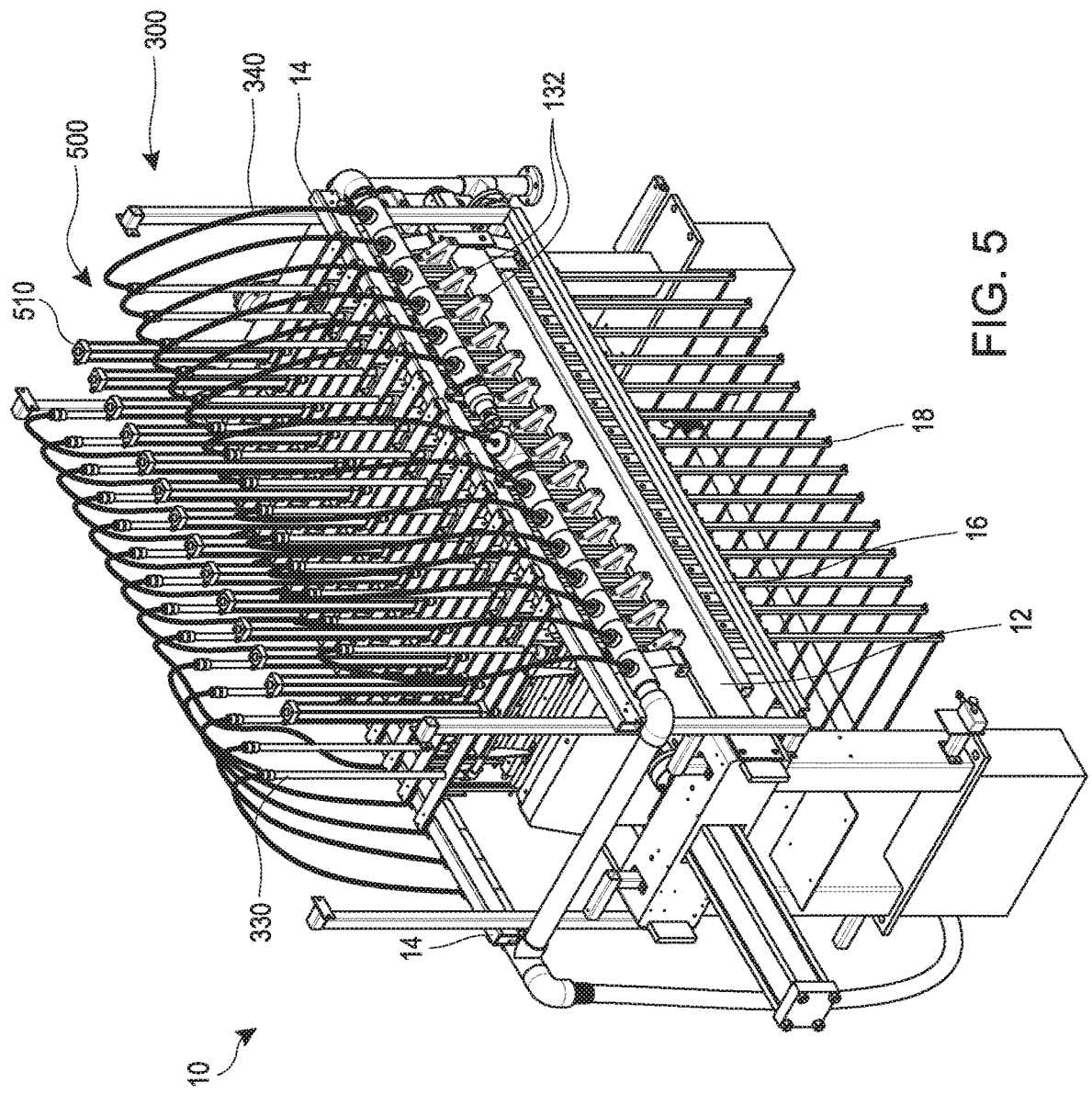
FIG. 5 is a perspective view of the filter press of FIG. 1 with the filter plate assembly in an open or discharged position. The center plates of the filter plate assembly are shown in an aligned (or up) position. The fluid hoses connecting the wash fluid source with the sprayer assemblies are shown.
Figure 6:
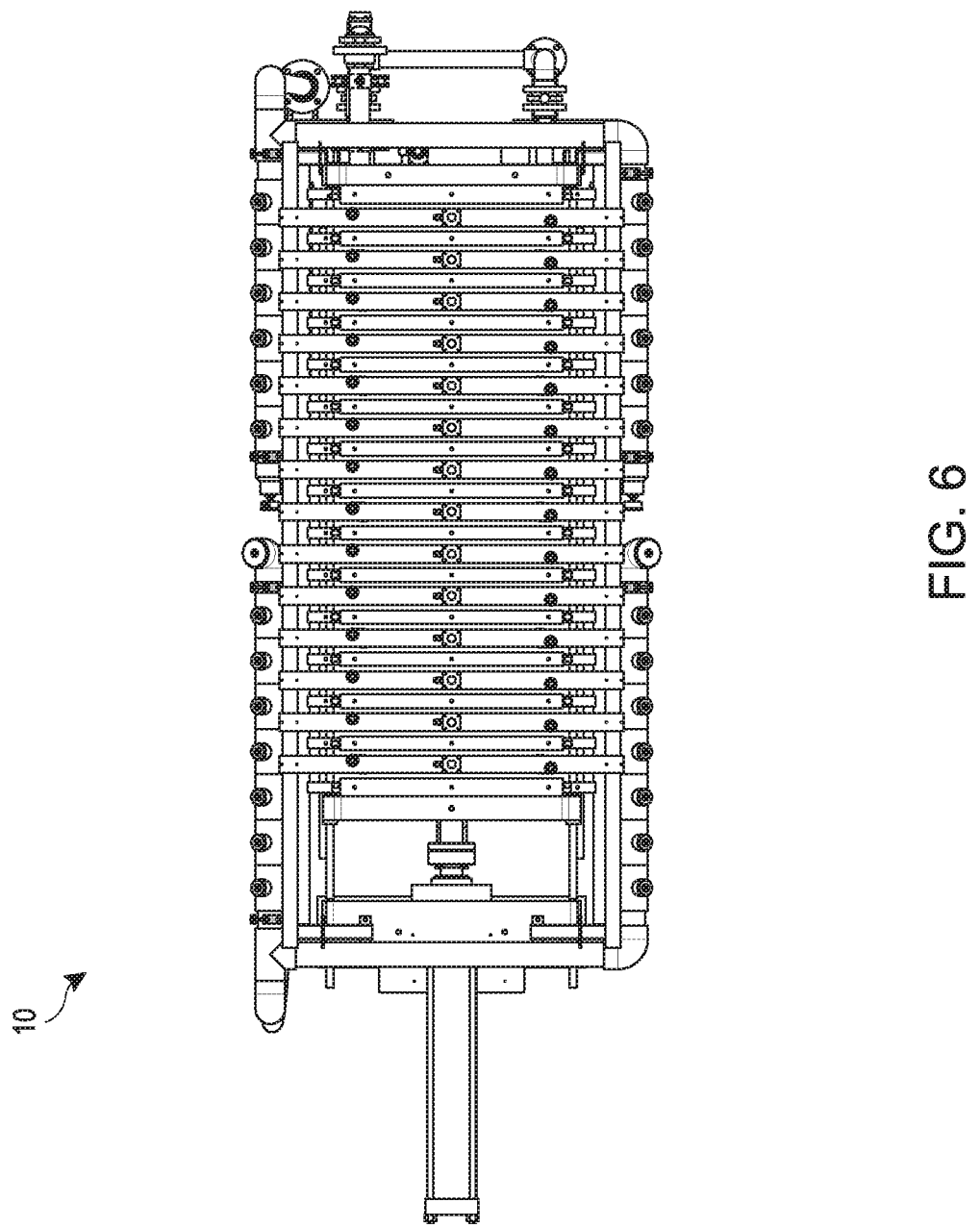
FIG. 6 is a top view of the filter press of FIG. 5 with the fluid hoses removed.
Figure 7:
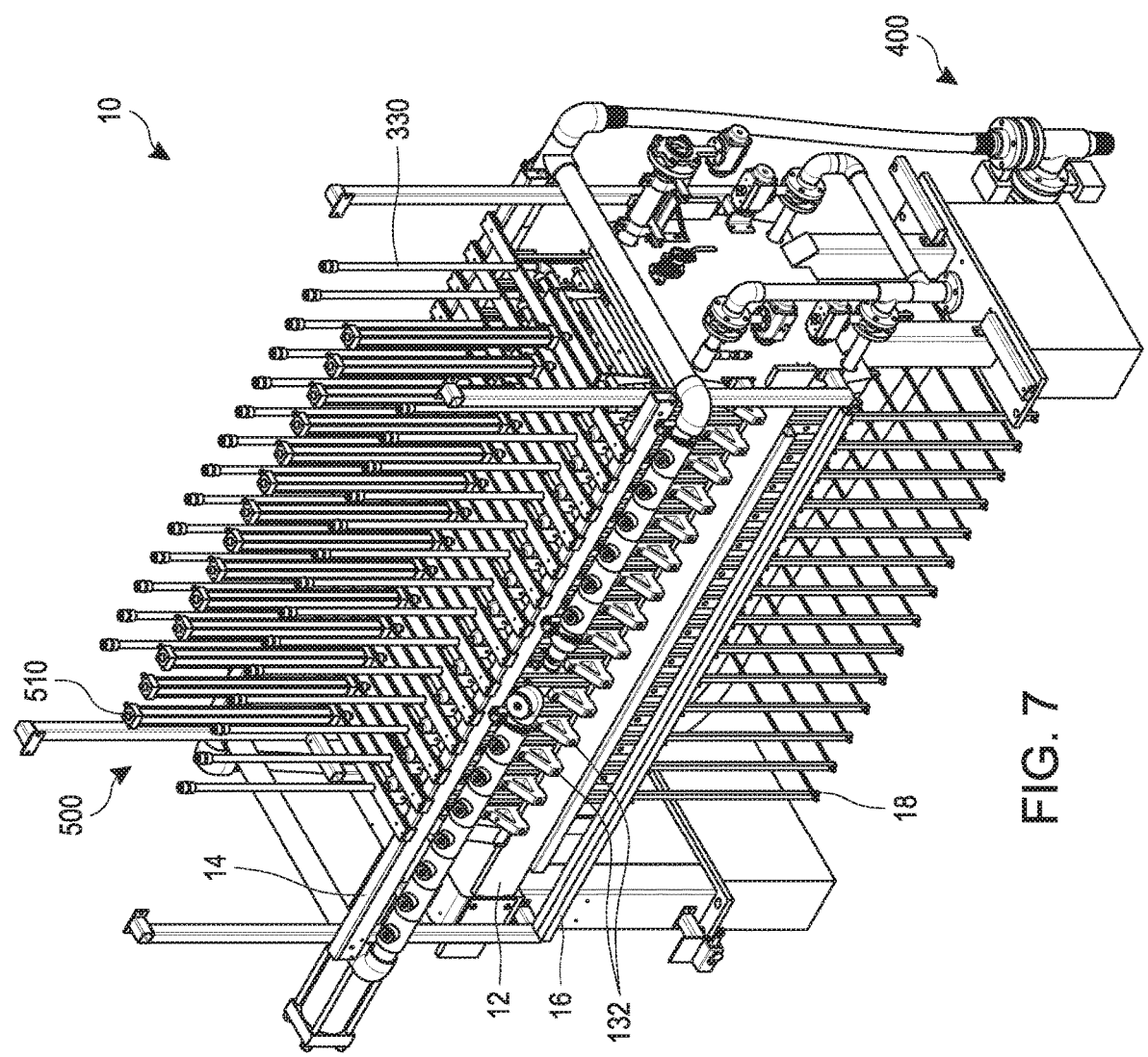
FIG. 7 is a perspective view of the filter press of FIG. 5 with the fluid hoses removed.
Figure 8:
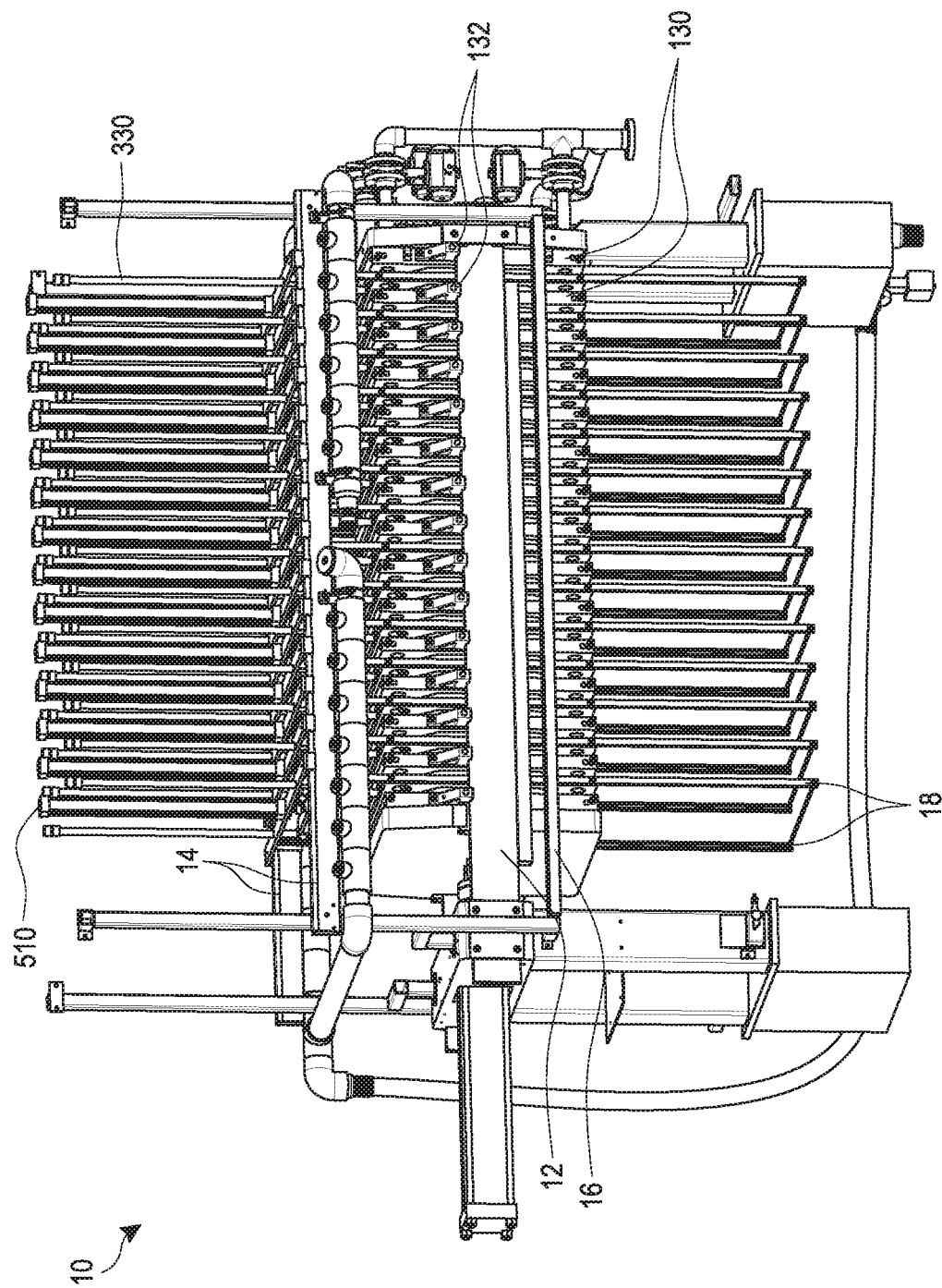
FIG. 8 is a side perspective view of the filter press of FIG. 5 with the fluid hoses removed.

A filter press is used to separate liquid and solid components from a liquid-solid mixture, such as a slurry or sludge. For example, the filter press described herein is generally referred to by the reference numeral 10 and can be used to filter a process liquid, industrial waste, municipal waste, or perform component separation in other settings. The filter press 10 may also be used in a variety of other industries. The filter press 10 includes a filter plate assembly, which is generally referred to by the reference numeral 100. The filter press 10 and/or filter plate assembly 100 are configured, in at least some embodiments, to permit partially or fully automated discharge of the particulate cake. Such an arrangement can reduce operation costs by eliminating the need for a person to perform manual cleaning of the filter plates, as is common with prior art filter presses.

In one embodiment, a filter plate assembly 100 includes a first filter plate 130, a second filter plate 130, a center plate or frame 120, and a force generator 510. The first filter plate 130 and the second filter plate 130 each have handles (or other support structures) 132 on opposing sides of the plate 130. The handles 132 allow the filter plates 130 to be supported by a pair of horizontal side rails 12. Preferably, the handles 132 slidably engage the upper surface of the side rails 12 such that the filter plates 130 can be moved along the rails 12 to permit individual filter plates 130 to be separated from one another (e.g., to permit the filter plate assembly 100 to move from a retracted to an expanded position). The center plate 120 is supported so as to be movable relative to the side rails 12 in a vertical direction. The center plate 120 can be referred to as a movable plate. In other embodiments, such as those in which the filter plate assembly 100 does not include a center plate 120 (e.g., a recessed cavity plate arrangement, such as that shown in FIGS. 20-22), the movable plate can be any plate(s) of the filter plate stack, including but not limited to one or both of the first filter plate 130 and the second filter plate 130. Similarly, instances of the term "center plate" in the present disclosure can be replaced with the term "movable plate" in view of embodiments in which plates other than the center plate are movable, unless indicated otherwise. In some configurations, the center plate 120, which rides or slides within a pair of vertical rails or tracks 18 supported by or relative to the side rails 120, is movable between an aligned position (upper position as shown) and a separated position (lower position as shown) relative to the first filter plate 130 and the second filter plate 130. When moving to the separated position, the center plate 120 drops or falls toward the ground under the force of gravity or is forcibly moved by the force generator 510. Preferably, the center plate 120 remains slidably engaged with the vertical rails 18 upon moving to or toward the separated position. The force generated by the center plate 120 suddenly stopping after dropping or being forcibly moved to the separated position results in the removal of particulate cake from the interior of the center plate 120. The center plate 120 is made to withstand the sudden stop after dropping or being moved to the separated position.

In a preferred embodiment, the force generator 510 is a pneumatic cylinder which utilizes a compressed gas (e.g., air) as its operating fluid. In other embodiments, the force generator can be a hydraulic cylinder, a screw jack, or any other suitable arrangement. In some configurations, the filter plate assembly 100 or associated filter press 10 does not include a force generator. For example, the movable filter plate 120 may be manually moved between the filtering or aligned position and the discharge position. While in the aligned position, the center plate 120 is situated in between a surface of the first filter plate 130 and a surface of the second filter plate 130, and is maintained in position by the force exerted by the pneumatic cylinder until such time that the filter plates of the filter press 10 are squeezed together in a sealed manner at which point the center plate 120 is held in place by squeezing force of the first and second plates 130. To move to the separated position, the center plate 120 is either no longer supported by the force of the pneumatic cylinder or the pneumatic cylinder pulls the center plate 120 downward toward or to the separated position. For example, the separated position is attained when the compressed gas of the pneumatic cylinder is vented or released to the atmosphere and allows the center plate 120 to fall to the separated position. The pneumatic cylinder can be used to lift the center plate 120 back to the aligned position once the cleaning process is complete. Alternatively, the pneumatic cylinder can pull the center plate 120 toward or to the separated position and can also be used to raise the center plate 120 back to the aligned position. The pneumatic cylinder (or other force generator) can be provided for each center plate 120 or can be configured to operate multiple center plates of the multiple filter plate assemblies of a filter press.

Figure 15:
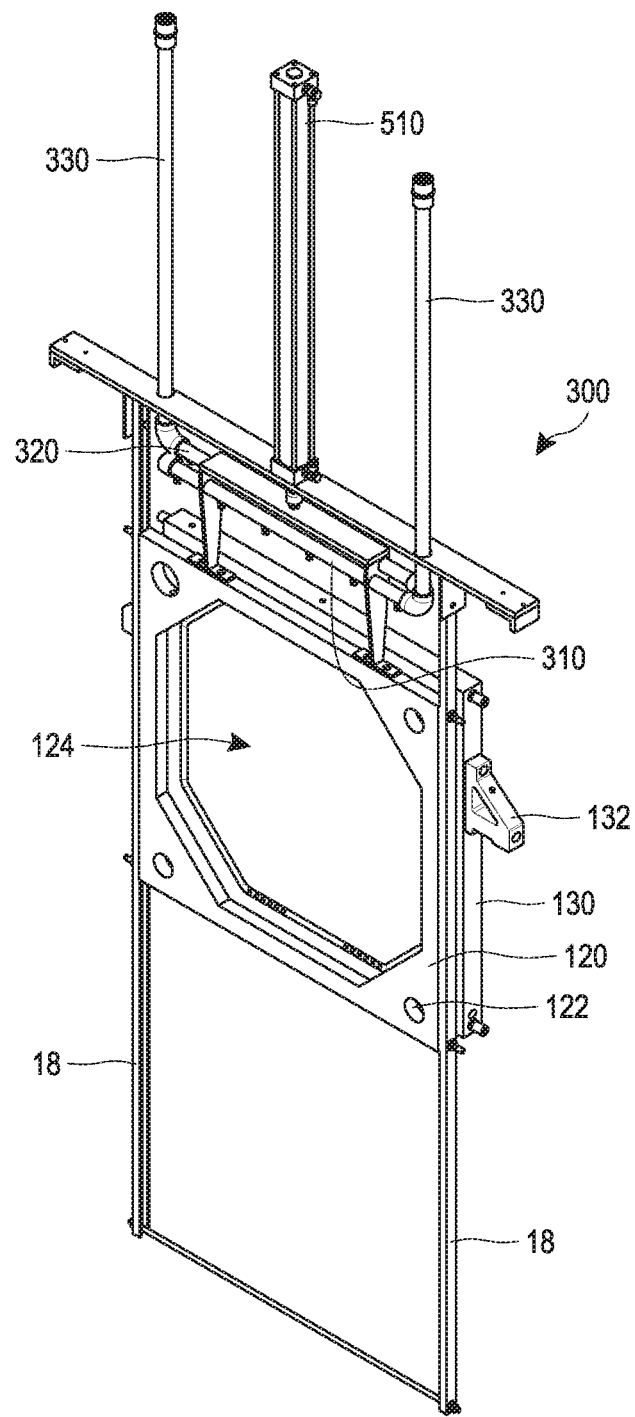
FIG. 15 a perspective view of the filter plate assembly and associated vertical rails, sprayer assemblies, and force generator of FIG. 12, with one of the filter plates removed.

In some embodiments, the interior region of the center plate 120 at least partially defines a filter chamber 124 as shown in FIG. 15, the filter chamber 124 having openings on each side of the center plate 120. While in the aligned position, the openings on each side of the center plate 120 are bounded and, in when the plates are pressed against one another, sealed by the surfaces of the first filter plate 130 and the second filter plate 130 such that the filter chamber 124 is in a closed position. The surfaces of the filter plates 130 facing the filter chamber 124 and bounding the filter chamber openings in the closed position are planar or generally planar such that the entire thickness of the filter chamber 124 is determined by the thickness of the center plate 120. In other embodiments, the filter chamber is defined, in part or in whole, by recessed cavities in adjacent filter plates.

In other embodiments, instead of the center plate 120 dropping or falling to the ground solely under the force of gravity, the center plate or frame 120 is additionally pulled down by human force. The center plate 120 is made to withstand the sudden stop upon reaching the separated position, even when pulled down by human force.

In some embodiments, the vertical rails 18 that support the center plate 120 are supported by or at least limited in movement by the side rails 12, which support the first and second filter plates 130. Such an arrangement is well-suited for retrofit applications. Although referred to as vertical rails, the rails 18 may be provided in other orientations, as discussed herein. Accordingly, it is not intended to limit the rails to a vertical orientation unless specifically indicated. In other embodiments, the center plate 120 rides within a pair of vertical rails 18 which are supported by a pair of hanging rails 14 situated above the pair of side rails 12. Preferably, a connection, such as a brace or strut 200, extends between and can connect the vertical rails 18. The brace 200 is supported by the hanging rails 14 and enables the vertical rails 18 to slidably move relative to the upper surface of the hanging rails 14. Optionally, the vertical rails 18 can be further stabilized by a pair of frame retention rails 16 situated below the pair of side rails 12. Such an arrangement can provide greater stability to the vertical rails 18. However, other suitable arrangements for supporting the movable plate(s) 120 can be employed. For example, the movable plate(s) 120 can be supported directly or indirectly by the force generator 510 or other support structure that moves or facilitates movement of the movable plate(s) 120. In some configurations, the movable plate(s) 120 can be directly supported only by the bracket 202, force generator 510 and brace 200. In other words, the vertical rails 18 and any corresponding structure can be omitted. Furthermore, in other configurations, the movable plate(s) 120 may not be directly supported at all. The side rails 12 of the filter press 10 can generally capture the movable plate(s) 120 and keep them in a position associated with the filter press 10.

In other embodiments, the center plate or movable plate 120 is provided with a wash apparatus 300 or components of a wash apparatus 300. The wash apparatus 300 is connected to a wash fluid source 400. The wash apparatus 300 comprises one or more sprayer assemblies or spray nozzles 310, 320. The sprayer assembly or spray nozzle 310, 320 is attached to an outer surface of or is otherwise movable along with the center plate 120, and resides exterior to each of the first filter plate 130, the second filter plate 130, and the center plate 120. Advantageously, such an arrangement allows for easier cleaning of the filter chamber 124. When the center plate or movable plate 120 is moved up or down relative to each of the first filter plate 130 and the second filter plate 130, the sprayer assembly 310, 320 moves with the center plate or movable plate 120 and washes or cleans the filter media of the first and second (or adjacent) filter plates 130. In the illustrated arrangement, the sprayer assembly 310, 320 is supported by a bracket 202, such as an inverted U-shaped bracket, that is connected to the center plate 120.

In other embodiments, the pair of hanging rails 14 can be provided with other devices or apparatuses. Alternatively, the pair of hanging rails 14 can serve as a pair of dedicated support rails, i.e., rails that serve only to support the vertical rails 18 within which the center plate or movable plate 120 rides. In other embodiments, the pair of dedicated support rails can be a pair of rails other than the pair of hanging rails 14.

Although in the illustrated arrangement, the center plate or movable plate 120 moves vertically downward relative to the first and second filter (or adjacent) plates 130 to take advantage of gravity acting to move the center plate or movable plate 120; such an arrangement is not required. The center plate or movable plate 120 can move out of registry with the first and second filter (or adjacent) plates 130 in any direction. In other words, in a filtering position, the filter plates 130 can be aligned along a longitudinal axis, which can be referred to as an operational axis. The movable filter plate(s) 120 can be moved in any direction that is normal to the operational axis or has a component of movement that is normal to the operational axis. For example, the plates 120 can be movable in a horizontal or vertical direction, or can be rotated about an axis, such as an axis that is displaced from the operational axis and that can be parallel to the operational axis. Such arrangement may allow better access to a receptacle for the particular cake or may be necessitated by lack of available space below the filter press 10.

Another embodiment is shown in FIGS. 1-19. Components, features, and advantages of other embodiments, that are not otherwise described or shown in FIGS. 1-19, can be included in this embodiment. Additionally, components, features, and advantages of this embodiment can be included in other embodiments.

In the embodiment of FIGS. 1-19, a filter plate assembly 100 includes a first filter plate 130, a second filter plate 130, and a center plate or frame 120. In the illustrated arrangement, the filter press 10 also includes a set of force generators 500; however, as discussed above, it is possible to have arrangements in which there are no force generators 500 and the movable plates are moved manually or via some other mechanism. The interior region of the center plate 120 defines a filter chamber 124 (as shown in FIG. 15), the filter chamber 124 having an opening on each side of the center plate 120. While in an aligned position, the openings on each side of the center plate 120 can be bounded and sealed by the surfaces of the first filter plate 130 and the second filter plate 130 such that the filter chamber 124 is in a closed position. FIGS. 1-4 show the filter plate assembly 100 in a retracted position with the center plates 120 of the filter plate assembly 100 in an aligned position relative to the first and second filter plates 130. The surfaces of the filter plates 130 facing the filter chamber 124 and bounding the filter chamber openings in the closed position are planar or generally planar such that the entire thickness of the filter chamber 124 is determined by the thickness of the center plate 120. However, as discussed above, the filter plate assembly 100 could include a set of filter plates having recessed cavities that cooperate with an adjacent filter plate to define a filter chamber. In such an arrangement, the interior plates typically have a cavity on each side such that a particular plate cooperates with the cavity of the adjacent plate on each side to define a filter chamber with each adjacent filter plate. The end plates typically have a cavity only on the interior side. Thus, thickness of the filter chamber is partially defined by the cavity of each filter plate. The description below is in the context of an assembly having a center plate 120; however, the same description can apply to a plate assembly having recessed cavities. Accordingly, reference to the center plate 120 can refer to any movable plate of a plate assembly having recessed cavities.

Figure 9:
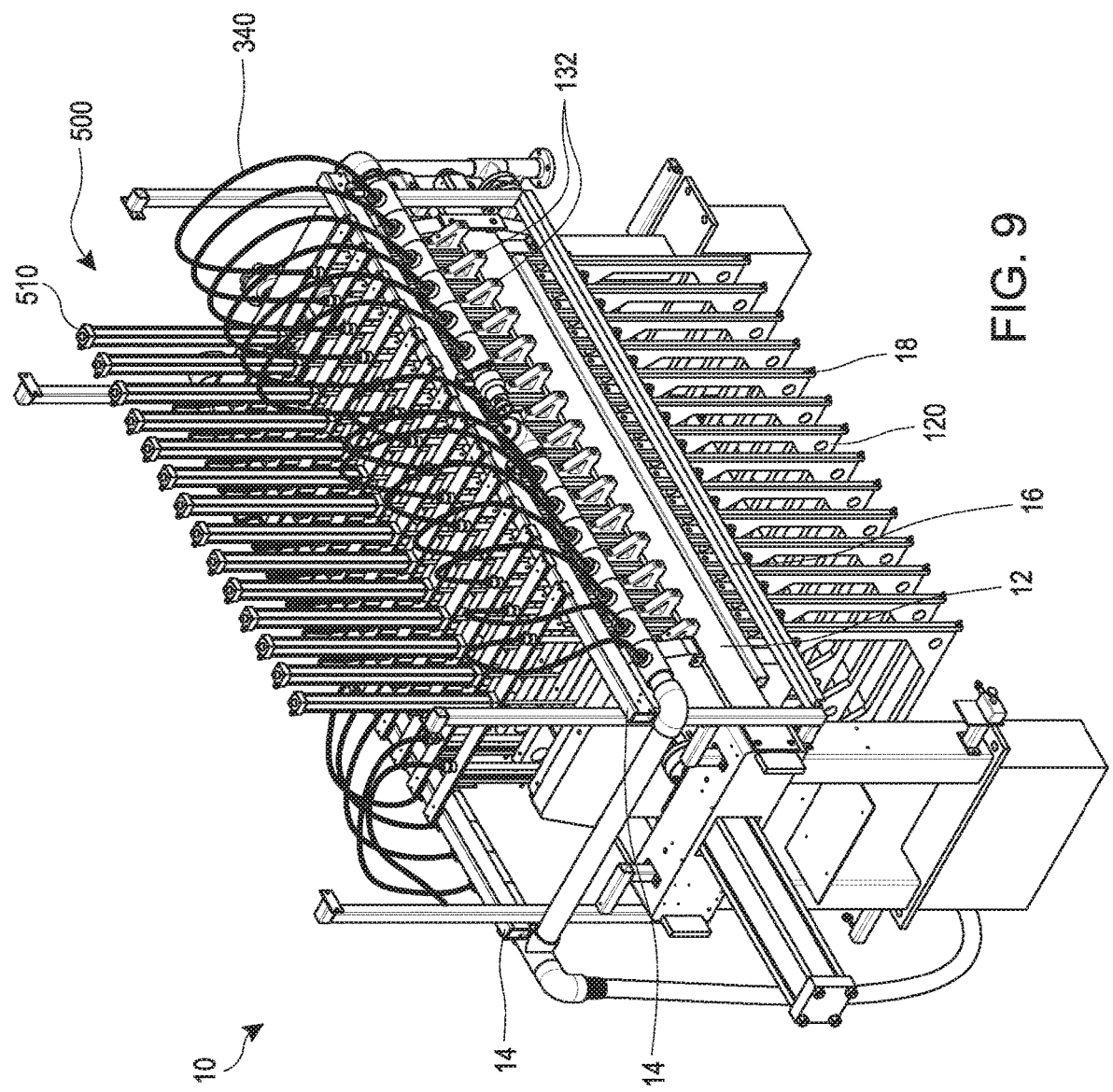
FIG. 9 is a perspective view of the filter press of FIG. 5 with the center plates of the filter plate assembly shown in a separated (down or discharge) position.
Figure 10:
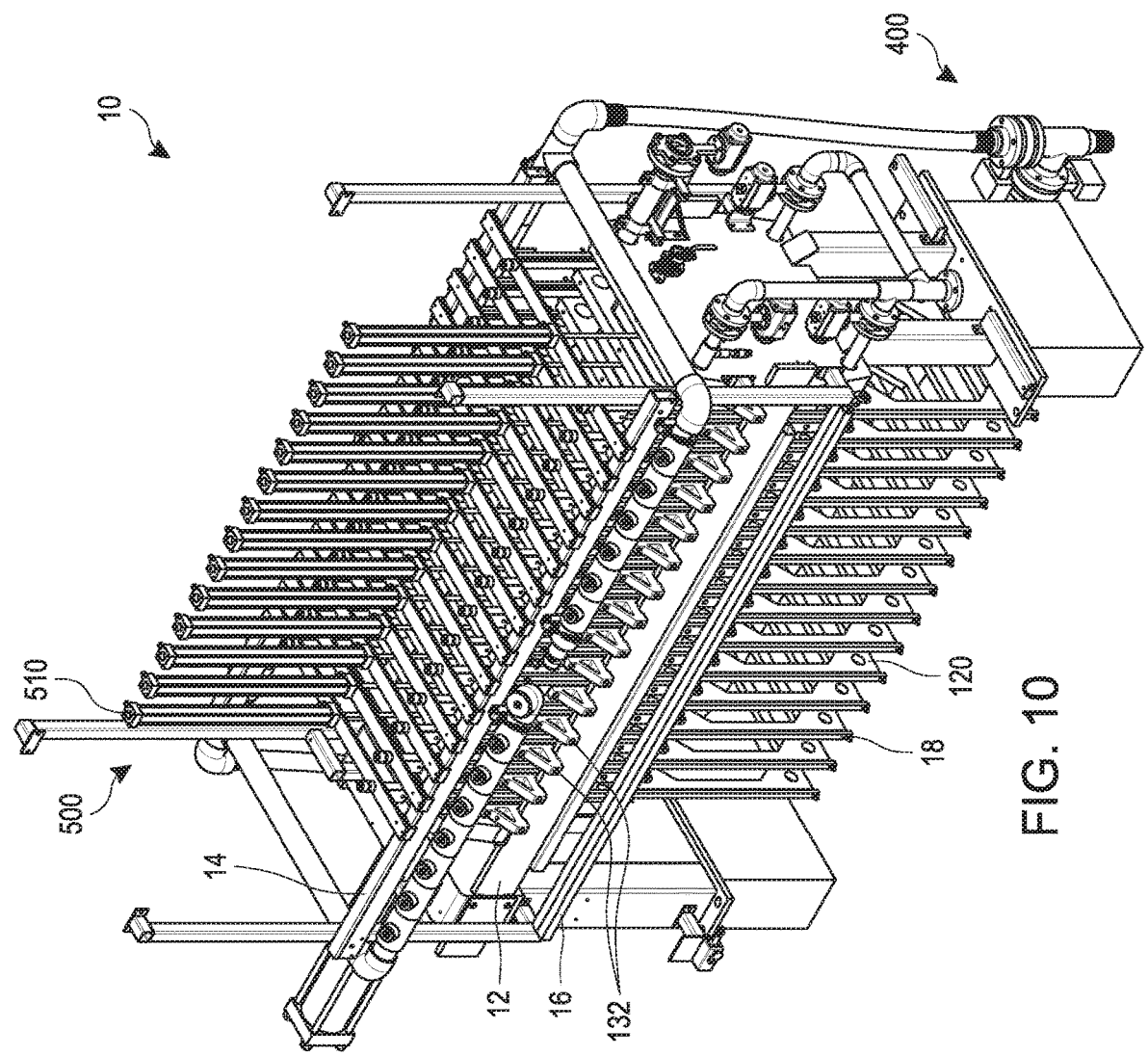
FIG. 10 is another perspective view of the filter press of FIG. 9 with the fluid hoses removed.
Figure 11:
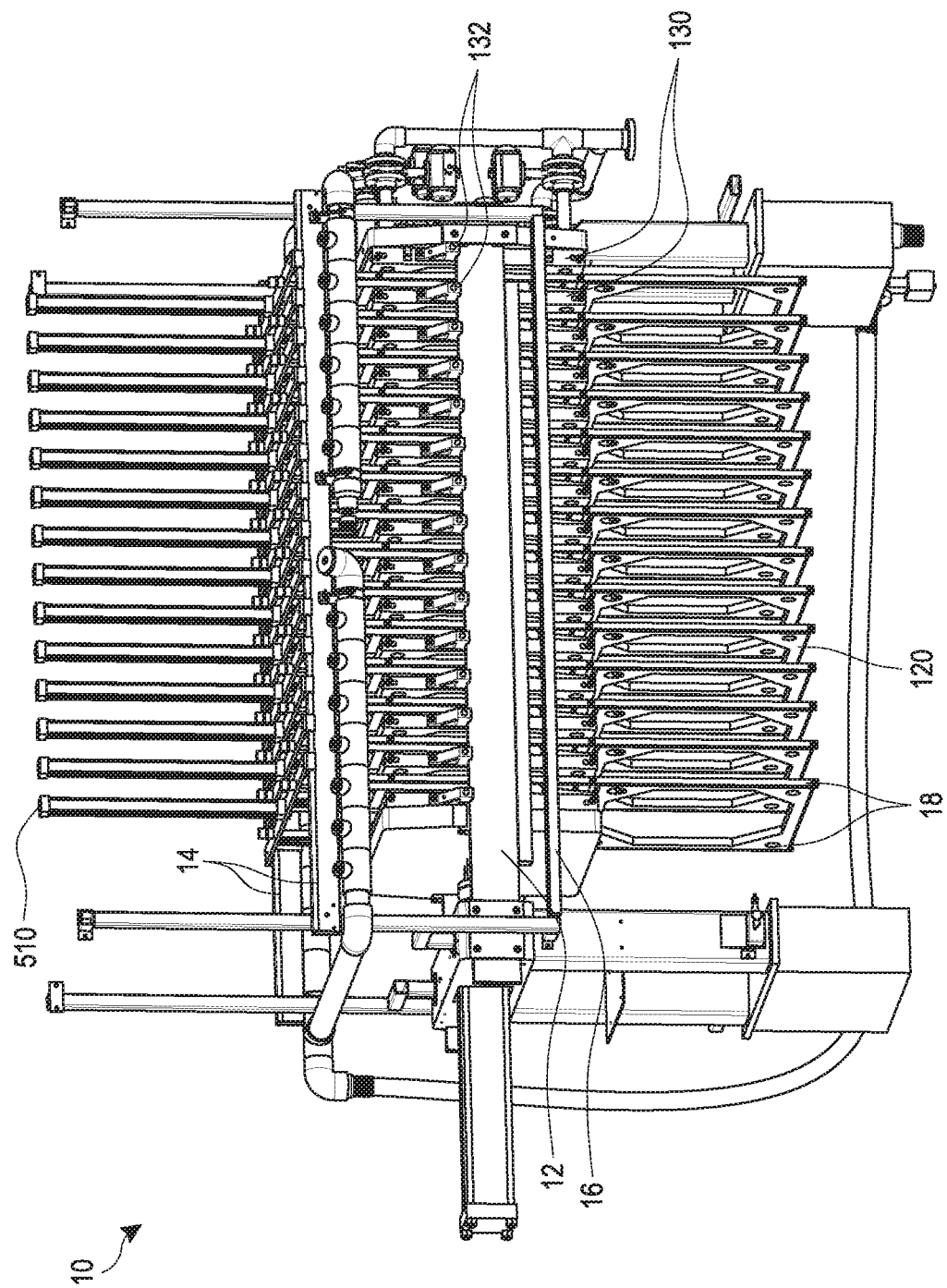
FIG. 11 is a side perspective view of the filter press of FIG. 9 with the fluid hoses removed.
Figure 12:
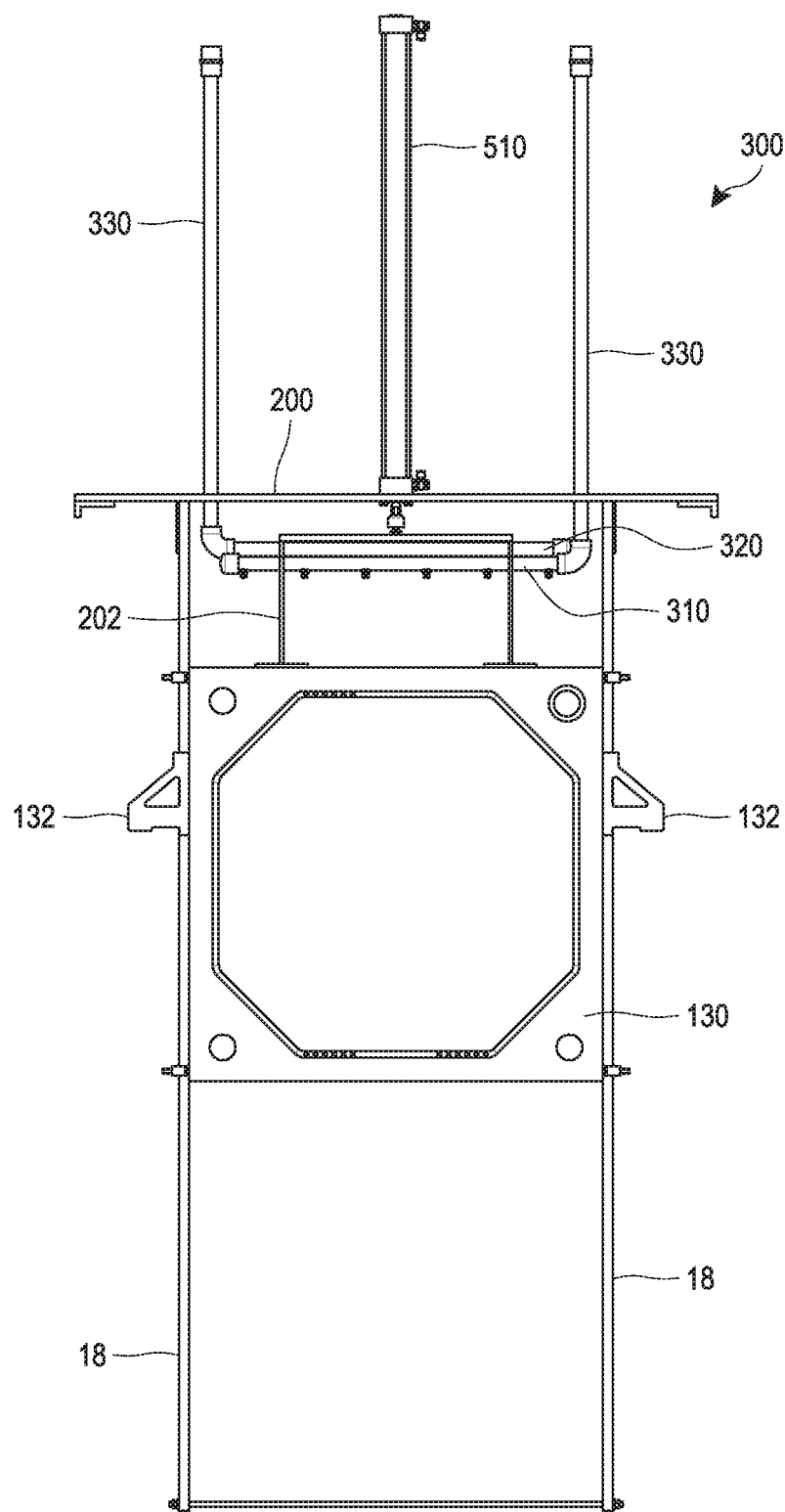
FIG. 12 is a transverse view of a filter plate assembly comprising a first filter plate, a second filter plate, and a center plate shown removed from the filter press, along with associated vertical rails, and sprayer assemblies also removed from the filter press.
Figure 13:
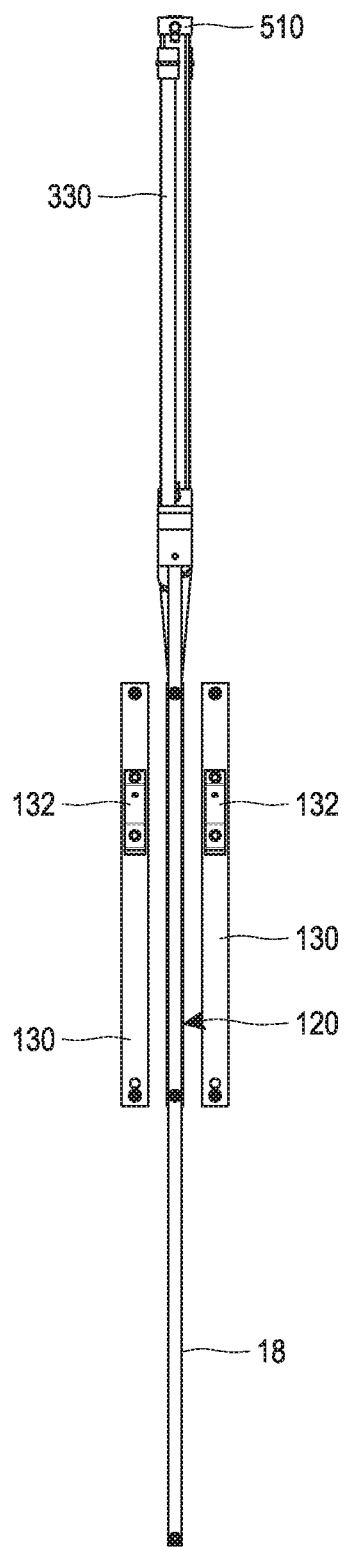
FIG. 13 is a side view of the filter plate assembly and associated vertical rails, sprayer assemblies, and force generator of FIG. 12.
Figure 14:
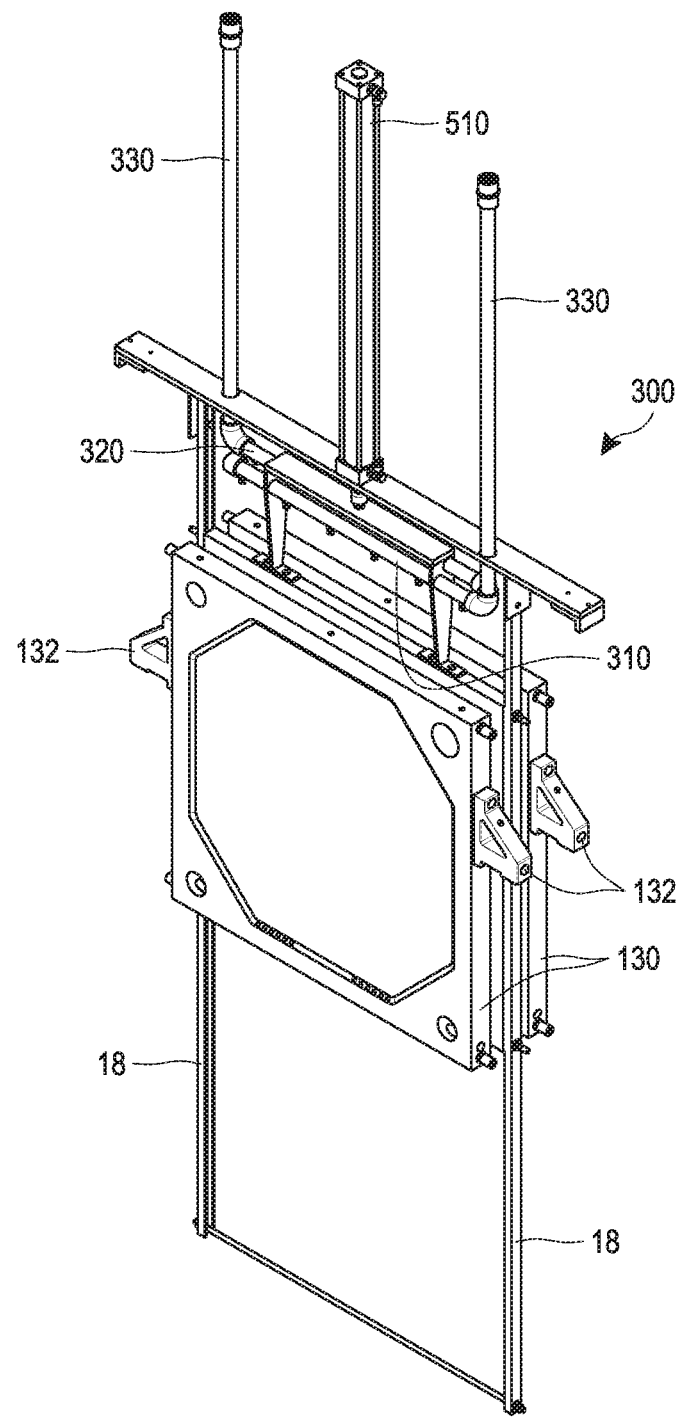
FIG. 14 is a perspective view of the filter plate assembly and associated vertical rails, sprayer assemblies, and force generator of FIG. 12.

As shown for example in FIGS. 1, 3-5, and 7-11, the set of force generators 500 comprises a force generator 510 provided for each center plate 120. Each force generator 510 is located and held in a position above the respective center plate 120. For example, each force generator 510 can be supported by the brace 200 and can be connected to the center plate 120 via the bracket 202. The force generators 510 facilitate the downward and/or upward movement of the center plate 120 (relative to the first filter plate 130 and the second filter plate 130) during and after discharge of particulate cake from the filter chamber 124. The force generator 510 can push the center plate 120 downward toward or to a separated position relative to the first filter plate 130 and the second filter plate 130. Alternatively, the center plate 120 can drop or fall to the ground or to a separated position (any lower position as shown) solely under the force of gravity. FIGS. 9-11 show the filter plate assembly 100 in an expanded position with the center plates 120 of the filter plate assembly 100 in a separated (or down) position relative to the first and second filter plates 130. The force generator 510 can also be used to lift the center plate 120 upward back to the aligned position. In each of these cases, the center plate 120 preferably rides or slides within a pair of vertical rails 18 which are supported by one or both of a pair of side rails 12 and a pair of hanging rails 14. FIGS. 5-8 show the filter plate assembly 100 in an expanded position with the center plates 120 of the filter plate assembly 100 in an aligned (or up) position relative to the first and second filter plates 130. The position of the center plates 120 shown in FIGS. 5-8 can be either before the center plates 120 are moved to the separated position (under the force of the force generators 510 or solely under the force of gravity) or after the center plates 120 have been lifted upward back to the aligned position (and before the filter plate assembly 100 has been returned to a retracted position).

The force generators 510 are supported directly or indirectly by a pair of hanging rails 14. The force generators 510 can be pneumatic cylinders which utilize a compressed gas as its operating fluid. The force generators 510 can also be hydraulic cylinders. Other types of force generators 510 can also be used. Moreover, the force generators 510 can be located in any suitable location to move the movable filter plates 120. For example, as shown in FIGS. 1, 3-5, and 7-11, the force generators 510 can be positioned above each respective center plate 120. The force generators 510 can also be located below each respective center plate 120. In some configurations, the force generators 510 are pneumatic cylinders located either above or below the center plates 120 and that exert a pressure of, for example, approximately 100 lbs each. In other configurations, instead of having a dedicated force generator 510 for each center plate 120, a single force generator can be provided that is coupled (or that can be coupled) to multiple center plates 120, such as a sub-set or all of the center plates 120. For example, two force generators can be provided, in the form of hydraulic cylinders, each of the hydraulic cylinders coupled to about half of the available center plates 120 and configured to exert a pressure of, for example, approximately or up to 5000 lbs each.

In addition to providing force to facilitate upward and/or downward movement of each center plate 120, the force generators 510, individually or in combination, can be used to provide the force necessary to maintain the first filter plate 130, the second filter plate 130, and the center plate 120 in the aligned position. In the aligned position, the center plate 120 is situated in between a surface of the first filter plate 130 and a surface of the second filter plate 130, and is maintained in position by the force exerted by the force generator(s) 510. However, generally, a dedicated force generator (or force generators), separate from the force generators 510 associated with each center plate 120, will be provided for this purpose and will compress the collection of filter plate assemblies in an axial direction in a manner similar to or the same as conventional filter presses.

In a typical filter plate assembly 100 comprising a first filter plate 130 and a second filter plate 130 (and no center plate 120), the first and second filter plates 130 are squeezed or held together by a pressure of up to 3,000-4,000 lbs, or even up to 10,000 lbs or more in some configurations, in order to maintain a seal between the filter plates 130 at the treatment pressures, which can be about 100 psi in the filtering mode and 200-250 psi in a membrane filter cake squeeze mode. In the embodiment of FIGS. 1-19, the first filter plate 130, the second filter plate 130, and the center plate 120 can be squeezed or held together by a higher force compared to a recessed cavity plate assembly because the center plate 120 may be more susceptible to deformation than a recessed cavity plate. Furthermore, in at least some configurations, the center plates 120 can be held in the aligned position by this squeezing force without assistance from the force generators 510 used to move the center plates 120 into and out of the aligned position.

The pressure created within the cavity defined by the first filter plate 130, the second filter plate 130, and center plate 120 in an aligned or sealed position during the filtering process can result in the center plate 120 expanding in a radial direction as a result of the internal pressure. The side rails 12 can provide support to inhibit expansion, in a radial direction, in response to the forces generated by the internal pressure. In addition, or alternatively, the first and second filter plates 130 and the center plate 120 can be keyed together to inhibit expansion of the center plate 120, in a radial direction, in response to the compressive forces and/or in response to fluid pressure within the filter chamber. Preferably, both sides of the center plate 120 have key recesses 122 (shown in FIGS. 15-17 and 19) that are adapted to mate with corresponding keys of the first and second filter plates 130. In this way, both the first and second filter plates 130 are keyed to the center plate 120. The key recess 122 can be a hole or other structure that is configured to receive a structure on the filter plate 130. Alternatively, the center plate 120 can have keys or protrusions on each side that are configured to be received within key recesses of the filter plates 130. In other embodiments, the filter plates 130 and the center plate 120 can have ridges or grooves that are configured to engage each other to prevent relative movement between them. The keying structures can be provided in suitable locations around a perimeter of the center plate 120. Expansion is typically less of an issue in recessed cavity filter plates; however, keying or other interlocking structures could be used in such filter plate assemblies, if desired.

Figure 16:
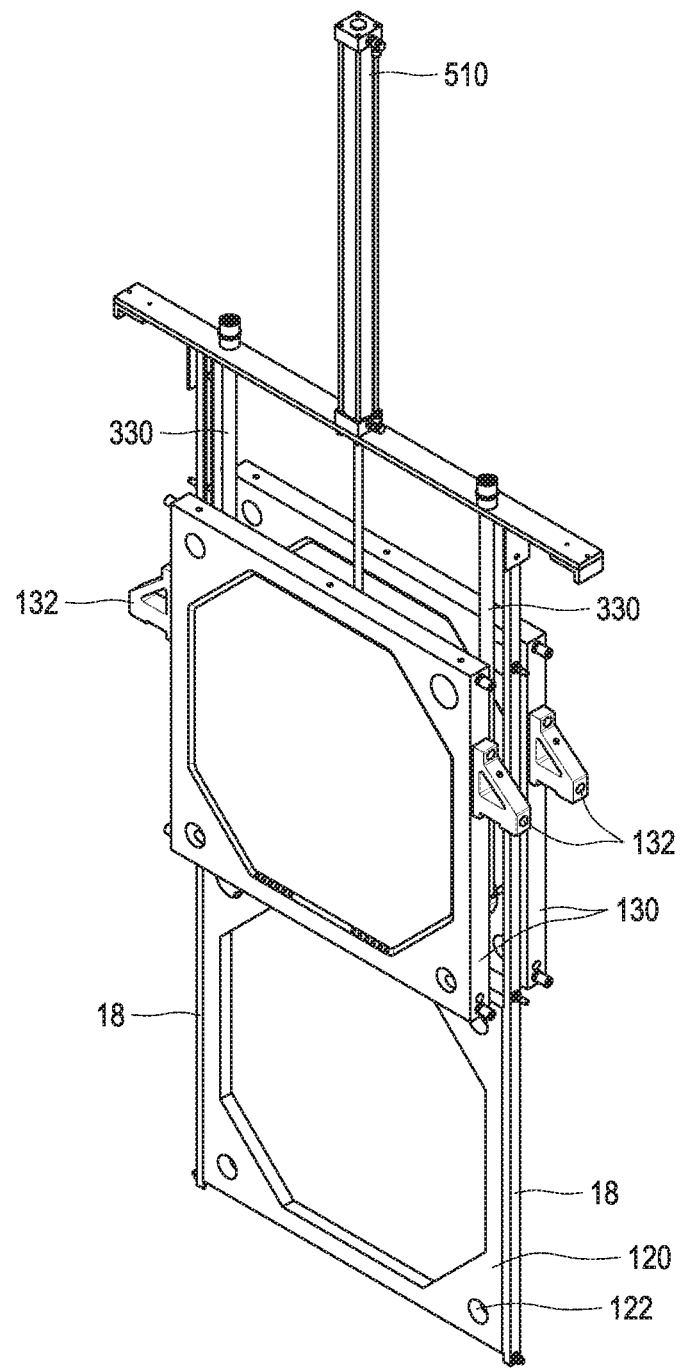
FIG. 16 a perspective view of the filter plate assembly and associated vertical rails, sprayer assemblies, and force generator of FIG. 12, with the center plate shown in a separated (or down) position.
Figure 17:
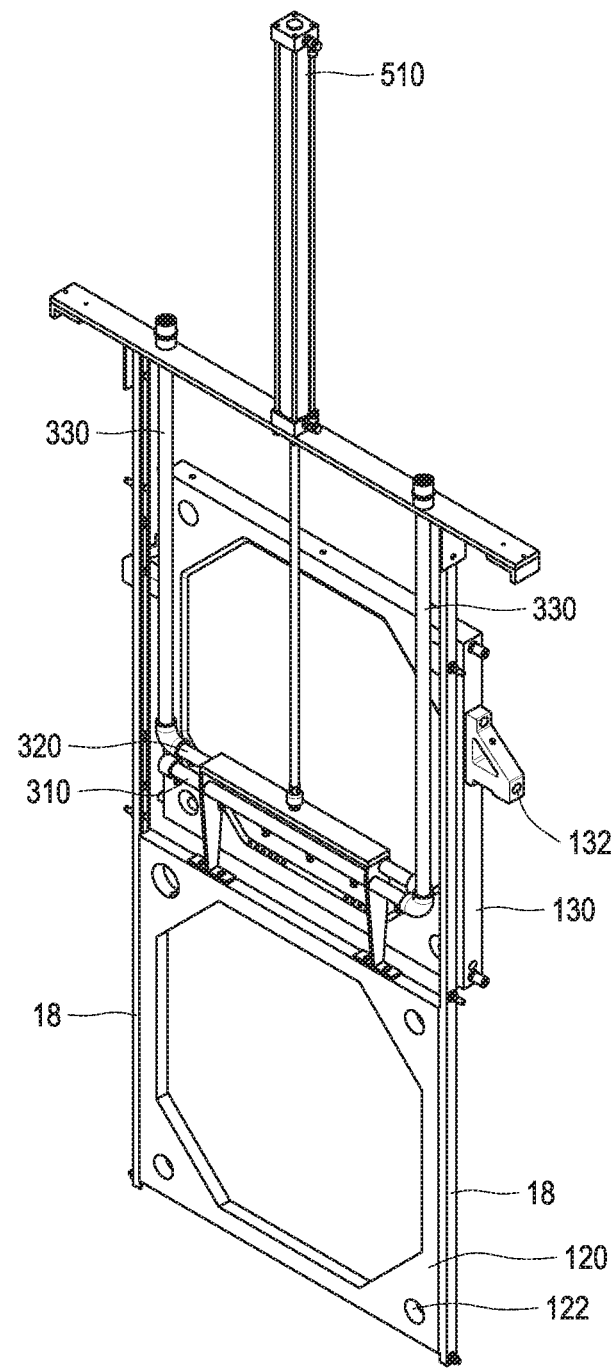
FIG. 17 a perspective view of the filter plate assembly and associated vertical rails, sprayer assemblies, and force generator of FIG. 16, with one of the filter plates removed.
Figure 18:
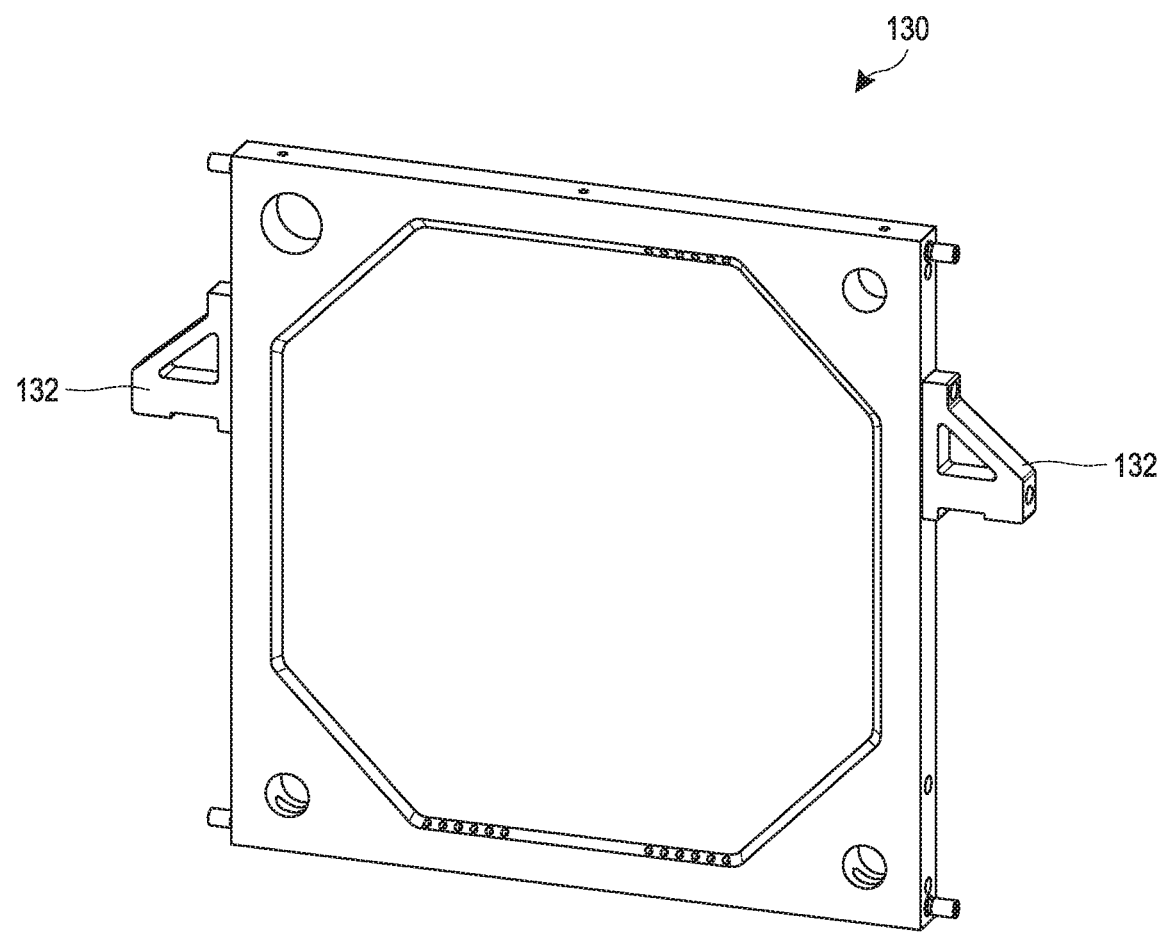
FIG. 18 is a perspective view of one filter plate having a recessed cavity of the filter plate assembly of FIG. 12.
Figure 19:
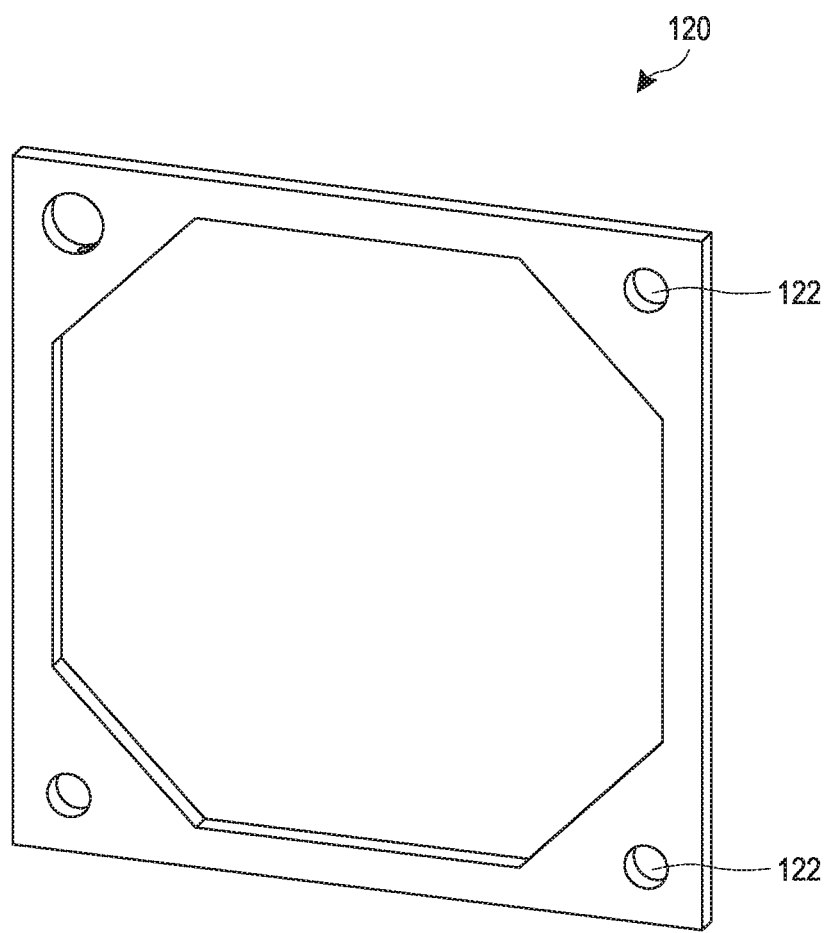
FIG. 19 is a perspective view of the center plate of the filter plate assembly of FIG. 12.

As shown for example in FIGS. 12, 14, 15, and 17, in some configurations, each center plate or movable plate 120 is provided with a wash apparatus 300 or components of a wash apparatus 300. The wash apparatus 300 is connected to a wash fluid source 400 which supplies water or other wash fluid. The wash apparatus 300 comprises a first sprayer assembly or spray nozzle 310, a second sprayer assembly or spray nozzle 320, a pair of fluid hoses 340 (shown in FIGS. 5 and 9), and a connecting pipe 330 between each fluid hose 340 and each sprayer assembly or spray nozzle 310, 320. Alternatively, instead of providing a connecting pipe 330, each fluid hose 340 can be directly connected to the respective sprayer assembly 310, 320. Each sprayer assembly 310, 320 resides exterior to each of the first filter plate 130, the second filter plate 130, and the center plate or movable plate 120. A connection is provided between the sprayer assemblies 310, 320 and the center plate or movable plate 120, to secure the sprayer assemblies 310, 320 to the center plate or movable plate 120. Preferably, the first sprayer assembly 310 is configured to wash or clean one side of the center plate or movable plate 120 and/or one of the first and second filter plates 130, and the second sprayer assembly 320 is configured to wash or clean the other side of the center plate or movable plate 120 and/or the other filter plate 130. As shown in FIGS. 16 and 17, the sprayer assemblies 310, 320 move downward with the center plate or movable plate 120, such that the sprayer assemblies 310, 320 wash or clean the first and second filter plates 130 as the center plate or movable plate 120 is moved downward (or upward) relative to the first and second filter plates 130. However, in other embodiments, the sprayer assemblies 310, 320 can be configured to wash or clean the first and second filter plates 130 and the center plate or movable plate 120 from a stationary position relative to the first and second filter plates 130. Carrying the spray nozzles and/or other portions of the wash apparatus on a filter plate that defines a portion of a filter chamber allows for fully or partially automatic washing at a lower cost than existing systems because less additional structure is required. That is, existing systems provide spray nozzles on a support structure that is entirely separate from the filter plates, which results in a higher overall cost than the illustrated arrangement. In other configurations, the filter press 10 may not include a wash apparatus and the filter plates can be manually cleaned or cleaned using a separate cleaning device (e.g., a spray pressure washer).

The sprayer assemblies 310, 320 can be configured to discharge wash fluid at a high pressure (and low volume). Given that the filter plate assembly 100 can comprise a large number of center plates 120 and, therefore, a large number of sprayer assemblies 310, 320, configuring the sprayer assemblies 310, 320 to discharge wash fluid at a high pressure typically requires a high-quality fluid pump capable of maintaining the high pressure throughout all of the sprayer assemblies 310, 320, which are connected in parallel. Where use of such a pump is cost prohibitive or where use of such a pump is technically infeasible or difficult, the sprayer assemblies 310, 320 can also be configured to discharge wash fluid at a relatively low pressure (and high volume), for example approximately 100 psi (and approximately 500 GPM). The pump required for such an arrangement has a lower cost than a high pressure pump therefore allowing the overall assembly to have a lower cost. It was unexpectedly discovered by the Applicant that a high volume, low pressure (HVLP) wash arrangement effectively cleans the filter plates. Other pressures and volumes are also possible. It is also possible to configure the sprayer assemblies 310, 320 such that the sprayer assemblies 310, 320 for only a subset of the center plates 120 (e.g., roughly a third of the sprayer assemblies 310, 320) discharge wash fluid at any given time. By configuring the sprayer assemblies 310, 320 in such way that only a subset of the sprayer assemblies 310, 320 discharge wash fluid at any given time, it is possible to maintain a high water pressure with a lower quality (or lower pressure) fluid pump.

Although multiple force generators 510 are illustrated (one for each center plate 120), in other arrangements a single force generator can be provided that is coupled (or that can be coupled) to multiple center plates 120, such as a sub-set or all of the center plates 120. Furthermore, although the center plates 120 are illustrated as moving in a vertical direction and below the first and second filter plates 130, other arrangements are also possible. For example, the center plates 120 can be configured to move upward, to either lateral side, in oblique directions relative to the first and second filter plates 130, in a swinging or rotational motion, or any other movement displaced from the operational axis.

Figure 20:
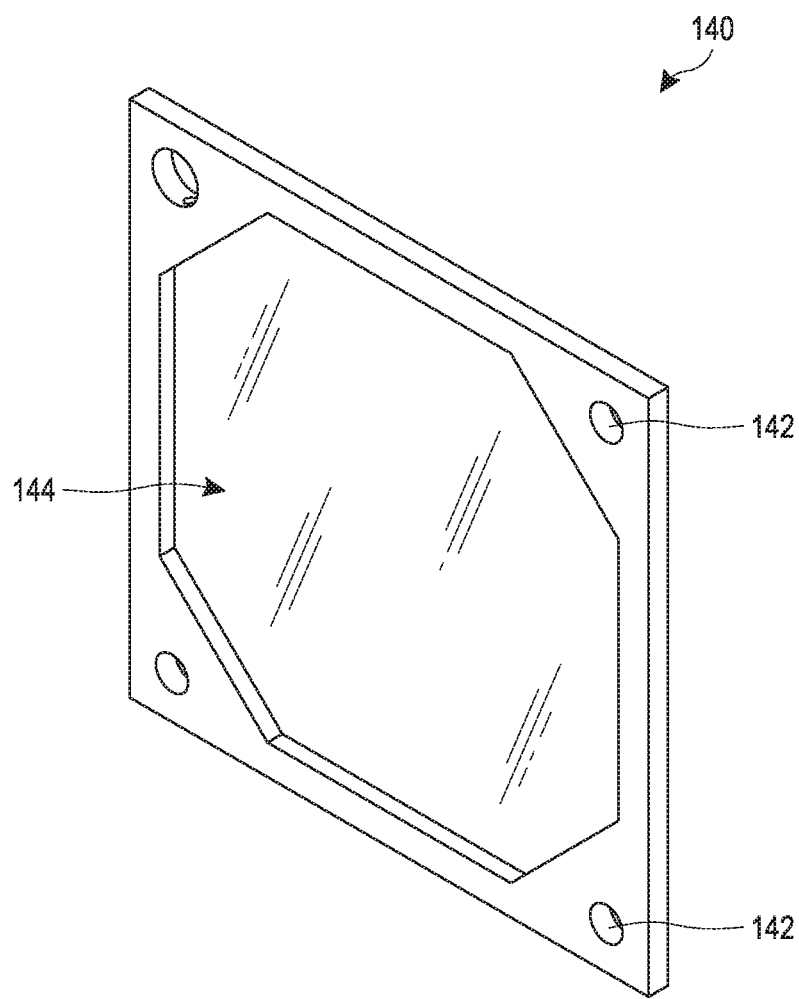
FIG. 20 is a perspective view of a filter plate having a recessed cavity.
Figure 21:
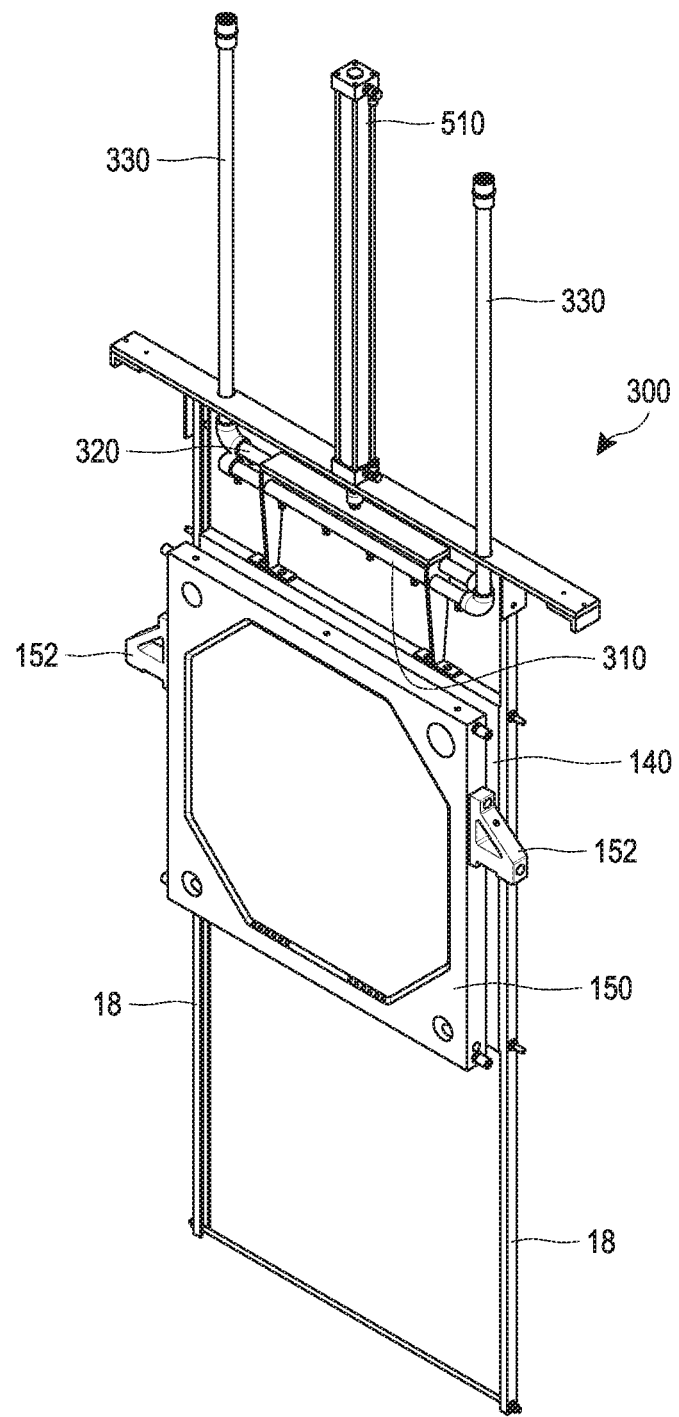
FIG. 21 is a perspective view of a filter plate assembly comprising a first filter plate and a second filter plate shown removed from the filter press, along with associated vertical rails, and sprayer assemblies also removed from the filter press. In the filter plate assembly of FIG. 21, at least one of the filter plates is a filter plate having a recessed cavity as shown in FIG. 20.
Figure 22:
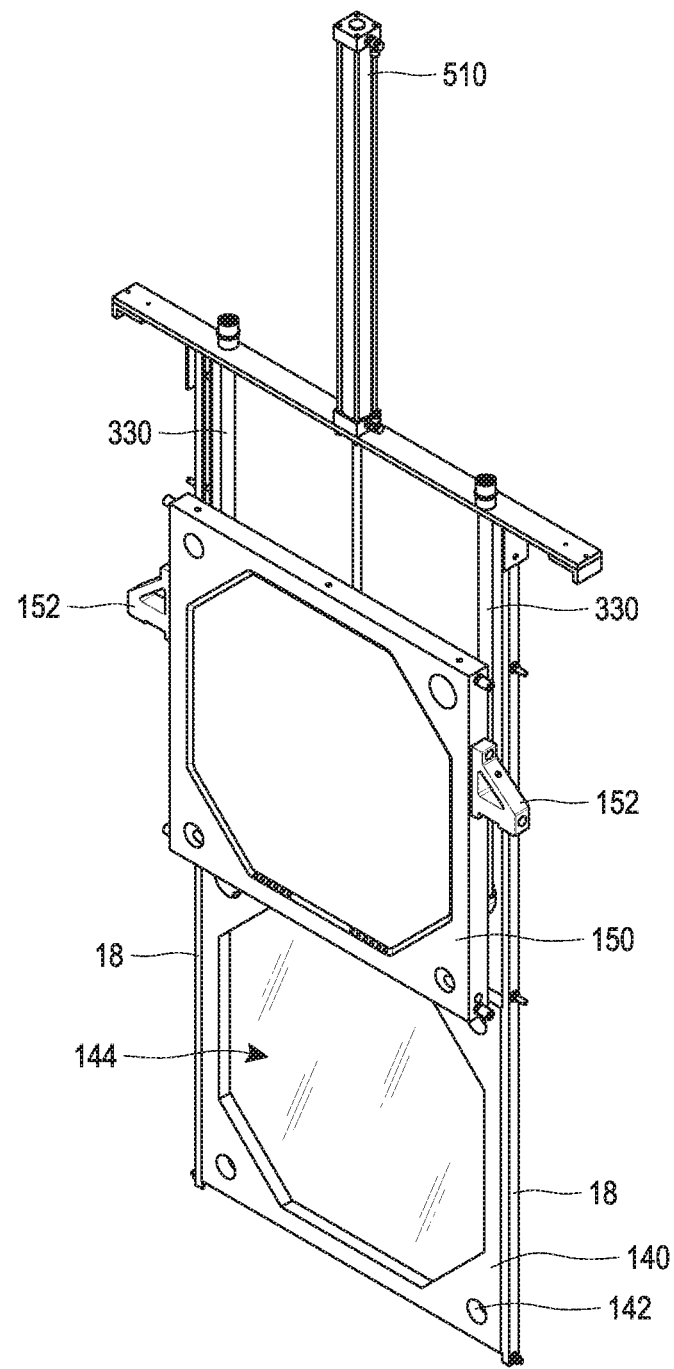
FIG. 22 is a perspective view of the filter plate assembly and associated vertical rails, sprayer assemblies, and force generator of FIG. 21. The filter plate of FIG. 20 is shown in a separated (or down) position.

Another embodiment is shown in FIGS. 20-22. Components, features, and advantages of other embodiments, that are not otherwise described or shown in FIGS. 20-22, can be included in this embodiment. Additionally, components, features, and advantages of this embodiment can be included in other embodiments.

In the embodiment of FIGS. 20-22, a filter plate assembly 100 for filter press 10 comprises a first filter plate or movable plate 140 having a recessed cavity 144 and a corresponding filter plate or second filter plate 150. The surface of the filter plate 150 facing the movable plate 140 cooperates with the movable plate 140 to form a filter chamber comprising the recessed cavity 144. In some embodiments, the surfaces of the filter plate 150 facing the filter chamber and bounding the filter chamber opening in the closed position are planar or generally planar such that the entire thickness of the filter chamber is defined by the recessed cavity 144 of the movable plate 140. For example, the thickness of the filter chamber can be defined by the depth of the recessed cavity 144. In other embodiments, the surface of the filter plate 150 facing the movable plate 140 can include a recessed cavity 154 (not shown) that cooperates with the recessed cavity 144 of the movable plate 140 to form a filter chamber. In such an embodiment, the thickness of the filter chamber is defined (at least in part) by the recessed cavities 144, 154. For example, the thickness of the filter chamber can be defined by the combined depth of recessed cavities 144, 154.

The movable plate 140 and the filter plate 150 can be keyed together. For example, the side of movable plate 140 facing the filter plate 150 can have key recesses 142 (shown in FIGS. 20 and 22) that are adapted to mate with corresponding keys of the filter plate 150. The key recess 142 can be a hole or other structure that is configured to receive a structure on the filter plate 150. Alternatively, the movable plate 140 can have keys or protrusions that are configured to be received within key recesses of the filter plate 150. In other embodiments, the filter plate 150 and the movable plate 140 can have ridges or grooves that are configured to engage each other to prevent relative movement between them. The keying structures can be provided in suitable locations around a perimeter of the movable plate 140.

As shown in FIGS. 21 and 22, the movable plate 140 preferably rides or slides within a pair of vertical rails 18. The vertical rails 18 allow the movable plate 140 to move between an aligned position (shown in FIG. 21) and a separated position (shown in FIG. 22) relative to the filter plate 150. The filter plate assembly 100 can include any number of movable plates 140 and corresponding or second filter plates 150 for use with a filter press 10. In some configurations, as shown in FIG. 21, each movable plate 140 is provided with a wash apparatus 300 or components of a wash apparatus 300. The wash apparatus 300 can have the same components and features as that described above in connection with the embodiments of FIGS. 1-19 and shown for example in FIGS. 12, 14, 15, and 17.

Figure 23:
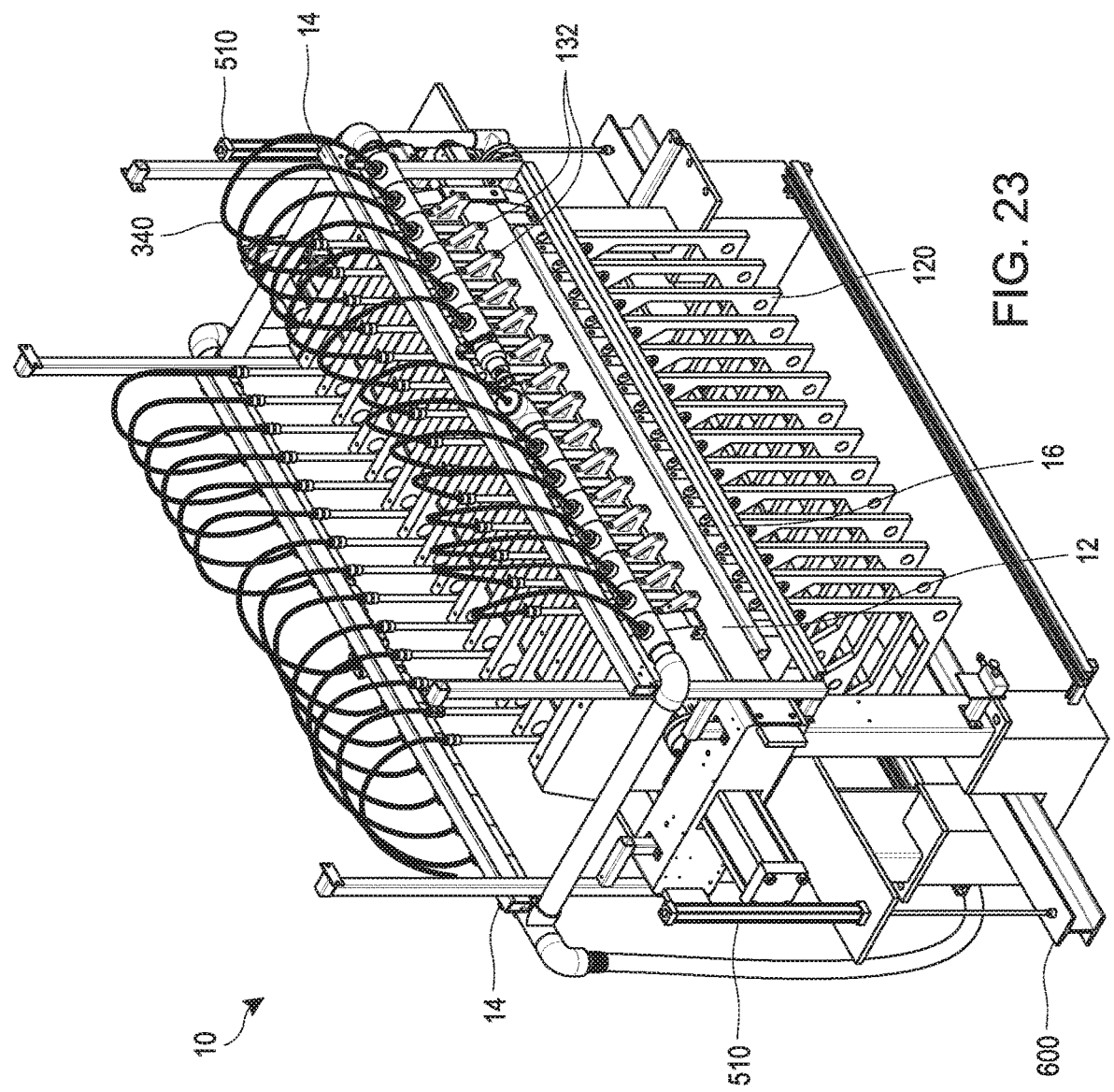
FIG. 23 is a perspective view of a filter press incorporating a plurality of filter plate assemblies, which omits the support rails or tracks for the movable filter plates. A linking element can engage more than one of the movable filter plates to selectively move the movable filter plates. One or more force generators can be configured to move the linking element. In some configurations, the number of force generators is less than the number of movable filter plates. The filter plate assemblies are shown in an open position and the movable filter plates in a down or discharge position.
Figure 24:
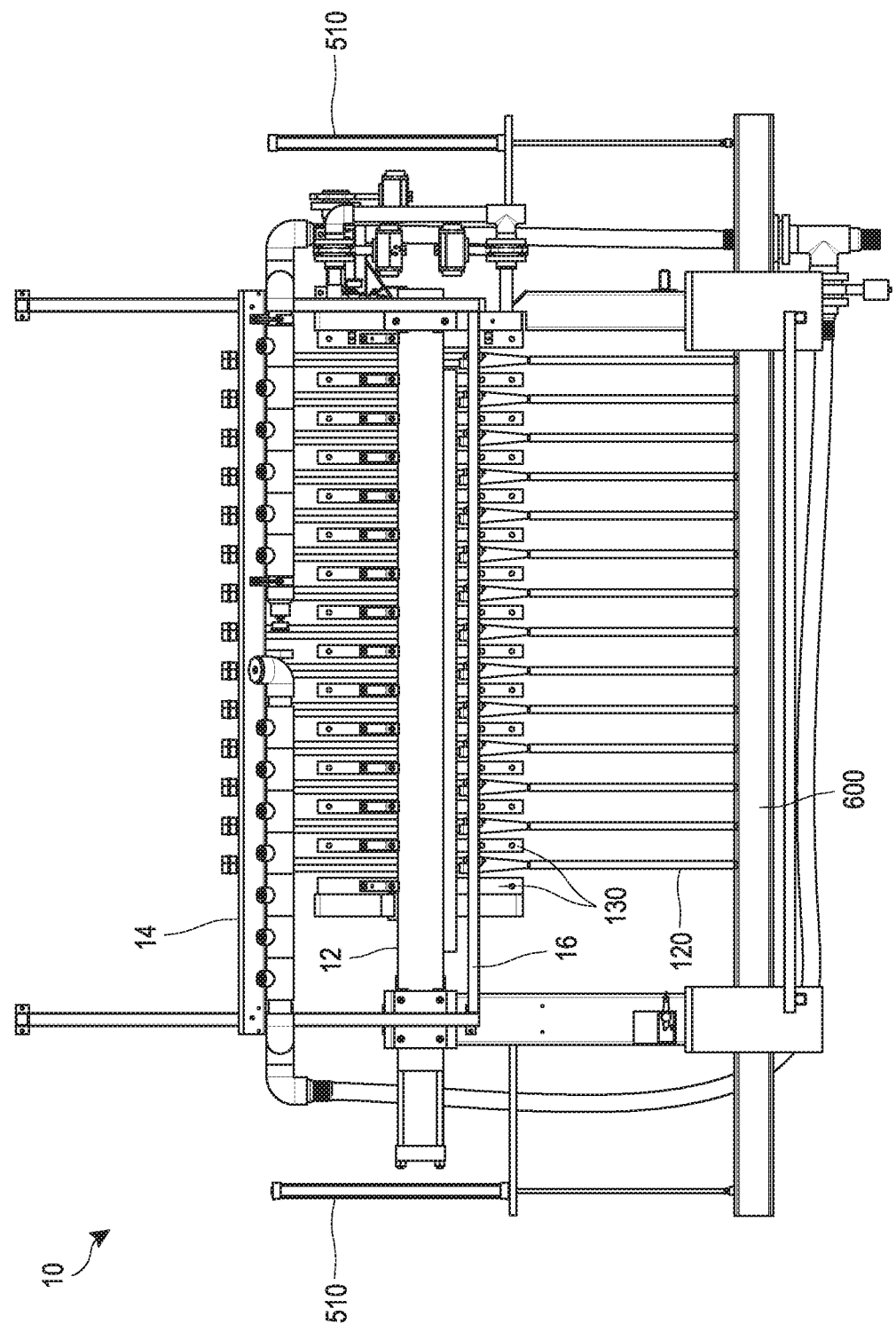
FIG. 24 is a side view of the filter press of FIG. 23 with the fluid hoses removed.

FIGS. 23-25 show a filter press 10 incorporating a plurality of filter plate assemblies 100, which omits the force generator 510 for each of the movable filter plates 120. In some configurations, the number of force generators 510 is less than the number of movable filter plates 120. In some configurations, a force generator 510 can be provided at each end of the stack of filter plate assemblies 100.

The force generator 510 or force generators 510 can act on the movable filter plates 120 through a force transfer element or mechanism, such as a beam (e.g., an I-beam 600). In some configurations, the force transfer element may be a linking element or linking mechanism, which links two or more of the movable filter plates 120. The term "link" as used herein means that the linking element acts upon two or more movable filter plates 120, which can include simply contacting the movable filter plates 120 or the linking element can be connected to two or more of the movable filter plates 120. The linking element 600 can engage more than one of the movable filter plates 120 to selectively move the movable filter plates 120. One or more force generators 510 can be configured to move the linking element.

The movable filter plates 120 can be supported by rails 18 in a manner similar to the embodiments described above. However, in other configurations, the movable filter plates 120 can be otherwise supported. For example, the movable filter plates 120 can be restrained in whole or in part by the side rails 12 of the filter press 10.

In some configurations, a portion or an entirety of the filter press 10 may be located on a scale or load cell arrangement such that the weight of the filter plate assembly (alone or in combination with other components of the filter press) can be determined. Such an arrangement can allow for a tare weight to be established, which can then allow for comparisons to weights at different points in the filtering process, including discharging and cleaning steps. Such an arrangement can allow for or facilitate a fully autonomous filter press by allowing the system to monitor the filling of the filter chambers with filter cake and confirm complete discharge of the filter cake and/or determine if additional cleaning is required. For example, one impediment to autonomous filter presses is a concern over incomplete removal of filter cake between filtering cycles. Cake residue at the beginning of a filter cycle can result in pressure differential between the portion of the filter chamber having the cake residue and adjacent portions of the filter chamber. This differential can result in undesirable stress on the filter plates, which over a period of time can weaken and possibly result in failure of the filter plate. As a result, many users opt for manual cleaning or at least manual inspection of the filter plates between cycles so that cake residue can be avoided. However, such cleaning or manual inspection is time-consuming (and, thus, expensive) and difficult.

Although the present invention has been described in terms of certain embodiments, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A filter plate assembly, comprising:
a first filter plate having a first face and a first edge surface coinciding with a first edge of the first filter plate; and
a second filter plate having a second face and a second edge surface coinciding with a second edge of the second filter plate, the second edge of the second filter plate facing in a same direction away from an operational axis as the first edge of the first filter plate;
wherein the first filter plate and the second filter plate have a filtering position in which the plates are aligned with one another along the operational axis and the first face and the second face cooperate to define opposing ends of a filter chamber, wherein the first face is configured to support a first filter media and the second face is configured to support a second filter media, wherein a particulate cake formed within the filter chamber has a maximum width equal to a distance between the first face and the second face in a direction along the operational axis;
wherein the first filter plate is movable out of alignment with the second filter plate in a direction perpendicular to and away from the operational axis to a discharge position in which the particulate cake can be discharged from a portion of the filter chamber defined by the at least one of the first filter plate and the second filter plate, wherein, in the discharge position, the first edge surface is located in a position past the second edge surface.

2. A filter plate assembly, comprising:
a first filter plate having a first side surface and a first edge surface, the first side surface comprising a first cavity and the first edge surface coinciding with a first edge of the first filter plate; and
a second filter plate having a second side surface and a second edge surface, the second side surface comprising a second cavity and the second edge surface coinciding with a second edge of the second filter plate, the second edge of the second filter plate facing in a same direction away from an operational axis as the first edge of the first filter plate;
wherein the first filter plate and the second filter plate have a filtering position in which the plates are aligned with one another along the operational axis and the first cavity and the second cavity cooperate to define a filter chamber with the first side surface and the second side surface define opposing ends of the filter chamber, wherein the first side surface is configured to support a first filter media and the second side surface is configured to support a second filter media, wherein a particulate cake formed within the filter chamber has a maximum width equal to a combined depth of the first cavity and the second cavity in a direction along the operational axis;
wherein at least one of the first filter plate and the second filter plate is a movable plate that is movable in a direction perpendicular to and away from the operational axis and out of the filtering position to a discharge position in which the particulate cake within the respective one of the first cavity and the second cavity can be discharged, wherein, in the discharge position, the first edge surface is located in a position past the second edge surface.

3. The filter plate assembly of claim 2, further comprising a force generator configured to exert a force to hold the movable plate in the filtering position or return the movable plate to the filtering position.

4. The filter plate assembly of claim 3, wherein the force generator is a pneumatic cylinder which utilizes a compressed gas as its operating fluid, a hydraulic cylinder that utilizes an incompressible fluid, an electric cylinder, or a screw jack.

5. The filter plate assembly of claim 2, wherein, in the discharge position, a portion or all of the movable plate is located outside of a space bounded by side edges of the other of the first filter plate and the second filter plate.

6. The filter plate assembly of claim 2, further comprising a first sprayer assembly attached to the movable plate at a location outside of the cavity, the first sprayer assembly connected to a wash fluid source.

7. The filter plate assembly of claim 6, wherein the first sprayer assembly is configured to direct a spray of wash fluid toward at least one of the other of the first and second filter plates and a third filter plate adjacent an opposite side of the movable plate from the other of the first and second filter plates.

8. The filter plate assembly of claim 6, further comprising a second sprayer assembly attached to the movable plate, the second sprayer assembly connected to the wash fluid source.

9. The filter plate assembly of claim 8, wherein the second sprayer assembly is configured to direct a spray of wash fluid in a direction opposite the first sprayer assembly.

10. The filter plate assembly of claim 2, further comprising at least one support structure that movably supports the movable plate.

11. The filter plate assembly of claim 10, wherein the at least one support structure comprises a first side track and a second side track located on opposite sides of the movable plate.

12. A filter plate assembly, comprising:
a first filter plate having a first side surface;
a second filter plate having a second side surface;
a center plate having an outer surface and an interior region, said center plate configured to be movable between an aligned position and a separated position relative to the first filter plate and the second filter plate,
wherein the first side surface is configured to support a first filter media and the second side surface is configured to support a second filter media, wherein a particulate cake formed within the filter chamber has a maximum width equal to a depth of the center plate in a direction along the operational axis,
wherein in said aligned position the center plate is held in place between the first side surface and the second side surface and a perimeter seal is created around the interior region between the center plate and the first side surface of the first filter plate and between the center plate and the second side surface of the second filter plate, and
wherein in said separated position the first filter plate and the second filter plate separate from the center plate a distance, said distance permitting the center plate to drop or move toward or to the separated position, whereupon the particulate cake is discharged can be discharged from the interior region of the center plate.

13. The filter plate assembly of claim 12, further comprising a force generator configured to exert a force to hold the center plate in place between the first side surface and the second side surface in said aligned position or return the center plate to the aligned position.

14. The filter plate assembly of claim 13, wherein the force generator is a pneumatic cylinder which utilizes a compressed gas as its operating fluid, a hydraulic cylinder that utilizes an incompressible fluid, an electric cylinder, or a screw jack.

15. The filter plate assembly of claim 14, wherein said separated position is attained when the compressed gas is released from the pneumatic cylinder.

16. The filter plate assembly of claim 12, wherein, in the separated position, a portion or all of the center plate is located below a first bottom surface of the first filter plate and a second bottom surface of the second filter plate.

17. The filter plate assembly of claim 12, further comprising a first sprayer assembly attached to the outer surface of the center plate, said first sprayer assembly connected to a wash fluid source.

18. The filter plate assembly of claim 17, wherein the first sprayer assembly is configured to direct a spray of wash fluid toward at least one of said first side surface and said second side surface.

19. The filter plate assembly of claim 17, further comprising a second sprayer assembly attached to the outer surface of the center plate, said second sprayer assembly connected to the wash fluid source.

20. The filter plate assembly of claim 19, wherein the second sprayer assembly is configured to direct a spray of wash fluid toward at least one of said first side surface and said second side surface.

21. The filter plate assembly of claim 12, further comprising at least one support structure that movably supports the center plate.

22. The filter plate assembly of claim 21, wherein the at least one support structure comprises a first side track and a second side track located on opposite sides of the center plate.

23. The filter plate assembly of claim 2, wherein the movable plate is movable in a vertical direction from the filtering position to the discharge position.

* * * * *